(12) United States Patent
Al-Hussein et al.

(10) Patent No.: US 8,746,566 B2
(45) Date of Patent: Jun. 10, 2014

(54) TWO-DIMENSIONAL SYMBOL AND METHOD FOR READING SAME

(75) Inventors: Hussein Al-Hussein, Larkspur, CA (US); Michael A. Christian, White Bear Lake, MN (US)

(73) Assignee: Veritec, Inc., Golden Valley, MN (US)

( * ) Notice: Subject to any disclaimer, the term of this patent is extended or adjusted under 35 U.S.C. 154(b) by 0 days.

(21) Appl. No.: 13/442,405

(22) Filed: Apr. 9, 2012

(65) Prior Publication Data

US 2012/0193427 A1   Aug. 2, 2012

Related U.S. Application Data

(62) Division of application No. 12/322,332, filed on Jan. 29, 2009, now Pat. No. 8,152,070.

(60) Provisional application No. 61/062,879, filed on Jan. 29, 2008, provisional application No. 61/196,200, filed on Oct. 15, 2008, provisional application No. 61/198,463, filed on Nov. 6, 2008.

(51) Int. Cl.
*G06K 7/10* (2006.01)

(52) U.S. Cl.
USPC ............. 235/462.11; 235/462.09; 235/462.25

(58) Field of Classification Search
USPC ........ 235/462.09, 462.1, 462.11, 462.25, 494
See application file for complete search history.

(56) References Cited

U.S. PATENT DOCUMENTS

| | | | |
|---|---|---|---|
| 2,612,994 A | 10/1952 | Woodland et al. | |
| 4,896,029 A | 1/1990 | Chandler et al. | |
| 4,924,078 A | 5/1990 | Sant'Anselmo et al. | |
| 4,972,475 A | 11/1990 | Sant'Anselmo | |
| 5,331,176 A | 7/1994 | Sant'Anselmo et al. | |
| 5,343,031 A | 8/1994 | Yoshida | |
| 5,568,555 A | 10/1996 | Shamir | |
| 5,612,524 A | 3/1997 | Sant'Anselmo et al. | |
| 5,616,905 A | 4/1997 | Sugiyama | |
| 5,862,270 A | 1/1999 | Lopresti et al. | |
| 5,995,665 A | 11/1999 | Maeda | |
| 6,070,805 A | 6/2000 | Kaufman et al. | |
| 6,126,074 A | 10/2000 | He et al. | |
| 6,601,772 B1 | 8/2003 | Rubin et al. | |
| 6,604,682 B2 * | 8/2003 | Wakamiya et al. | 235/462.01 |
| 6,651,893 B2 | 11/2003 | He et al. | |
| 6,674,919 B1 | 1/2004 | Ma et al. | |
| 7,637,436 B1 * | 12/2009 | Anderson | 235/494 |
| 2005/0242186 A1 * | 11/2005 | Ohbuchi | 235/462.09 |
| 2005/0269417 A1 | 12/2005 | Wood | |
| 2006/0226229 A1 | 10/2006 | Kim et al. | |
| 2006/0231635 A1 * | 10/2006 | Kim et al. | 235/494 |
| 2007/0152060 A1 * | 7/2007 | Kiliccote | 235/462.09 |
| 2008/0035730 A1 | 2/2008 | Look | |
| 2009/0242650 A1 * | 10/2009 | Ushijima et al. | 235/494 |

FOREIGN PATENT DOCUMENTS

JP   2004-005081   1/2004
WO   WO 2007/146303   12/2007

* cited by examiner

*Primary Examiner* — Ahshik Kim
(74) *Attorney, Agent, or Firm* — Kagan Binder, PLLC

(57) ABSTRACT

Disclosed is an identification symbol and system and method for reading in accordance with the present invention is preferably a two-dimensional, rectangular or square bar code symbol having a solid border, a tick-mark region adjacent to the solid border, a omni-directional reading and error detection and correction capability.

8 Claims, 22 Drawing Sheets

TWO-DIMENSIONAL SYMBOL AND METHOD FOR READING SAME

CROSS-REFERENCES TO RELATED APPLICATIONS

The present application is a divisional application of U.S. patent application Ser. No. 12/322,332, filed Jan. 29, 2009 now U.S. Pat. No. 8,152,070, which claims the benefit of U.S. provisional patent application No. 61/062,879 filed Jan. 29, 2008 for Two-Dimensional Symbol Reading Using Frequency Analysis and Opposite Side Bars and claims priority thereto and which applications are incorporated herein by reference in their entirety. This application also claims the benefit of U.S. provisional patent application No. 61/196,200 filed Oct. 15, 2008 for Two-Dimensional Symbol Reading Using Frequency Analysis and Opposite Side Bars and U.S. provisional patent application No. 61/198,463 filed Nov. 6, 2008 for Two-Dimensional Symbol Reading Using Frequency Analysis and Opposite Side Bars, which applications are incorporated herein by reference in their entirety

BACKGROUND OF THE INVENTION

1. Field of the Invention

This application is directed to an identification symbol which can be used on items to be identified and, more particularly, to a two-dimensional bar code symbol and a system and method for recognizing and decoding information represented by the symbol.

2. Description of the Related Art

Optical imaging systems are commonly used to decipher data symbols printed on objects in order to identify the objects or to obtain information relating to the object. A bar code symbol is a common one-dimensional form of symbology, and typically comprises a pattern of vertical bars of various widths separated by spaces of various widths. Because the bar and space elements have different light reflecting characteristics, a reader can convert a symbol into an electrical signal by analyzing the light reflected from the symbol. The electrical signal can then be analyzed and decoded to provide an alphanumeric representation of the symbol, which can contain certain information about the object. Bar code symbols of this type are now in common usage in various applications, such as inventory control, point of sale identification, or logistical tracking systems.

Because conventional one-dimensional symbology requires a relatively large amount of space to convey a correspondingly small amount of data, so-called two-dimensional bar code symbologies have been developed. A two-dimensional symbology may comprise a matrix that occupies a uniform amount of space having a generally rectangular or square shape. Instead of bars and spaces, round or square marks disposed at particular rows and columns of the matrix correspond to the information being conveyed. Such two-dimensional symbologies as well as techniques for electronically coding data included therein are well known and are described in, for example, U.S. Pat. No. 5,612,524, U.S. Pat. No. 5,331,176, U.S. Pat. No. 4,972,475, and U.S. Pat. No. 4,924,078, the entire disclosures of which are incorporated herein by reference for all purposes.

Recent applications, however, of two-dimensional symbologies can require encoding of relatively large amounts of information. For example, encoding of biometric information for use on identification cards, bank cards or other types of media can require relatively large amounts of data to be included in a two-dimensional symbol. Thus, there is a need for a two dimensional symbology that can hold such amounts of data.

Additionally, use of such symbologies can include locating a two-dimensional bar code on carrier medium, such as a bank card or ID card, along with other graphic and textual information, such as photographs, textual personal data and/or organization logos. And, the process of reading a two dimensional symbol used in such a context can involve acquiring a photographic image of the entire carrier medium. As such, to read the two dimensional symbol, it needs to be efficiently identified among other graphic information. Additionally, such photographic images can be noisy, distorted, poorly lit and can render an image of the two-dimensional image that may be damaged or otherwise have missing sections. Accordingly, both the two-dimensional symbologies used in such applications and the methods for reading and decoding them need to be able to accommodate noise and distortion, and correct for poor lighting and/or missing sections of a symbol to accurately and efficiently decode such symbols. Further, for use in biometric identification applications such as on a bank card, two-dimensional symbologies should be relatively secure and contain safeguards against fraudulent use or copying.

SUMMARY OF THE INVENTION

The present invention fulfills these needs by providing methods and apparatuses for imaging and decoding certain information symbols such as two-dimensional symbols. In particular, a two-dimensional symbol in accordance with the present invention can include four solid borders defining an interior region, first shade tick marks and second shade tick marks arranged in an alternating pattern at the interior region of, and adjacent to, the four solid borders, and data cells in the interior of the alternating tick marks.

A method in accordance with the present invention of reading an information symbol having four solid borders defining an interior region, a plurality of first shade tick marks and a plurality second shade tick marks arranged in an alternating pattern at the interior region of the four solid borders and adjacent to the four solid borders, and data cells in the interior of plurality of first shade tick marks and plurality of second shade tick marks; includes acquiring an image of the information symbol, identifying the four borderlines in the image of the information symbol and locating the tick marks in the image of the information symbol; and decoding data in the data cells of the image of the information symbol. The four solid borders can advantageously make the information symbol easier and more efficient to locate. The tick marks can advantageously make both repairing any portion of an image of the information symbol more efficient and provide for relatively faster location of cells centers in the information symbol.

Additionally, a method in accordance with the present invention of binarizing an image of an information symbol includes tiling the image of the information symbol, generating a grayscale histogram for the data cells in each tile of the image of the information symbol, smoothing each generated grayscale histogram to indicate two local maxima, the two local maxima having a local minimum therebetween and determining a binarization threshold based on the location of the local minimum between the two local maxima. By tiling the image and generating a grayscale histogram for each tile, an image of an information symbol that has un-even lighting can advantageously be binarized with relatively high accuracy because only the light level in the local areas of each tile, which is likely relatively uniform, is used to determine the binarization threshold.

BRIEF DESCRIPTION OF THE DRAWINGS

The accompanying drawings, which are incorporated in and constitute a part of this application, illustrate several aspects of the invention and together with description of the embodiments serve to explain the principles of the invention. A brief description of the drawings is as follows.

DETAILED DESCRIPTION

Disclosed is an identification symbol that can represent any form of binary information that can be digitized including numbers, letters, images, photos, graphics and biometric information such as fingerprints or voice print data. An identification symbol in accordance with the present invention is preferably a two-dimensional bar code symbol that advantageously has a relatively high data capacity, can be read relatively quickly and can assume a rectangular format (as opposed to just a square format) so that it can be accommodated in a wide variety of locations. Additionally, an information symbol in accordance with the present invention includes error-correction and encryption capabilities. Also disclosed is a method for reading such information symbols. As used herein, the term "information symbol" or "image" of an information symbol or any portion of the information symbol can mean any representation thereof including, without limitation, a visible image, and transferred or stored mathematical or other type of data. Additionally, the principles of the present invention may be applied to any symbol employing a matrix of data cells or other symbology. An information symbol, as used herein, refers to any symbology, such as those commercially known under the tradenames Vericode™ or Data Matrix™ or Code One™ or the like, that employs a matrix of data cells.

I. Symbol Structure

Figure 1:
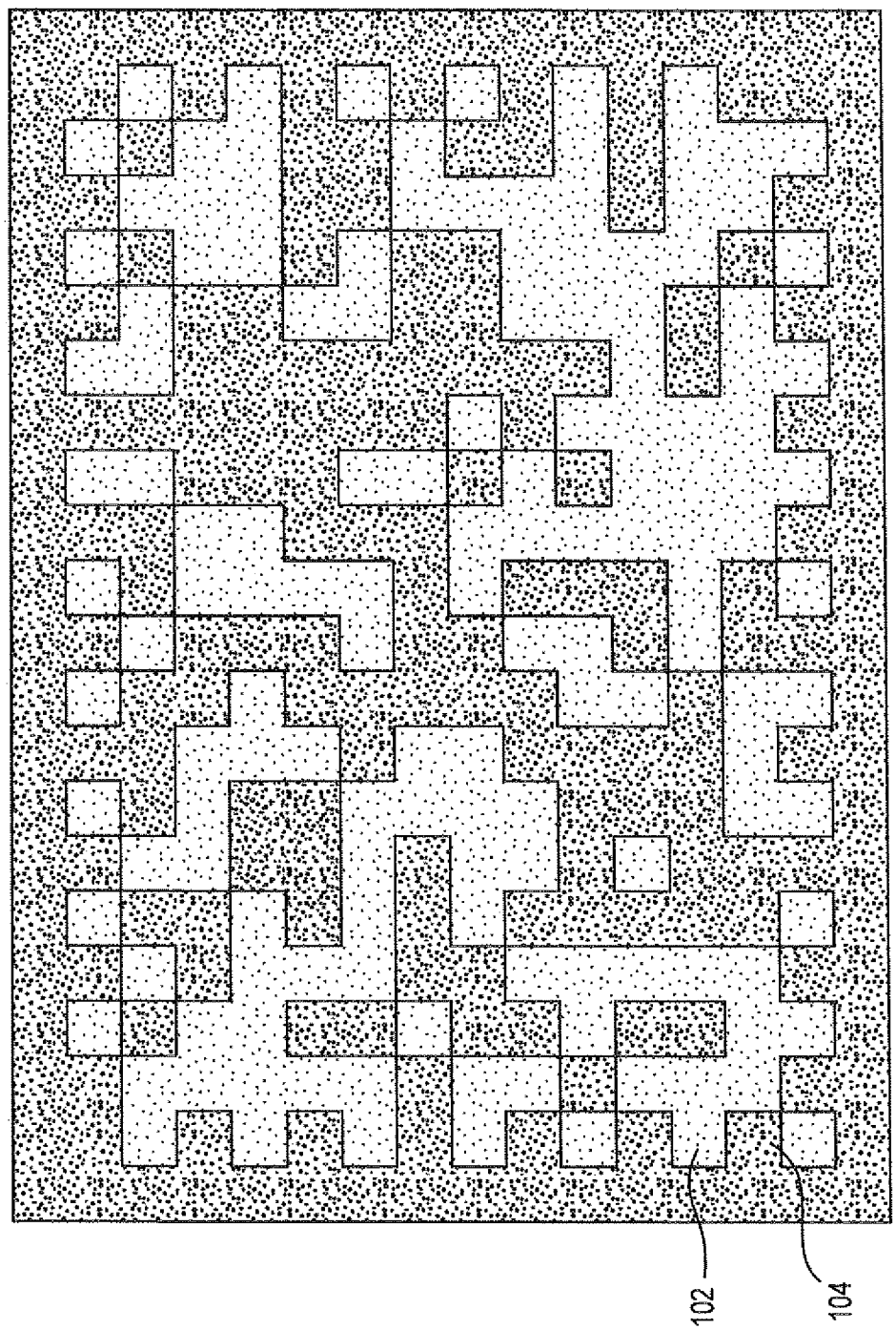
FIG. 1 illustrates one embodiment of an information symbol in accordance with the present invention.

FIG. 1 illustrates an example of a two dimensional bar code information symbol 100 in accordance with the present invention. Information symbol 100 is a 2D barcode matrix having foreground and background contrasting shaded square cells arranged in a square or a rectangular pattern. The foreground shade is preferably black, but may be another shade and the background shade is preferably white, but may also be another shade different from the foreground shade. In the embodiment of FIG. 1, cell 102 is a background shaded cell and cell 104 is a foreground shaded cell. While background and foreground cells may be any shade, background cells illustrated in the Figures herein will be white and foreground cells will be black. As used herein, the term "color" may include black, white and shades of gray.

Figure 2:
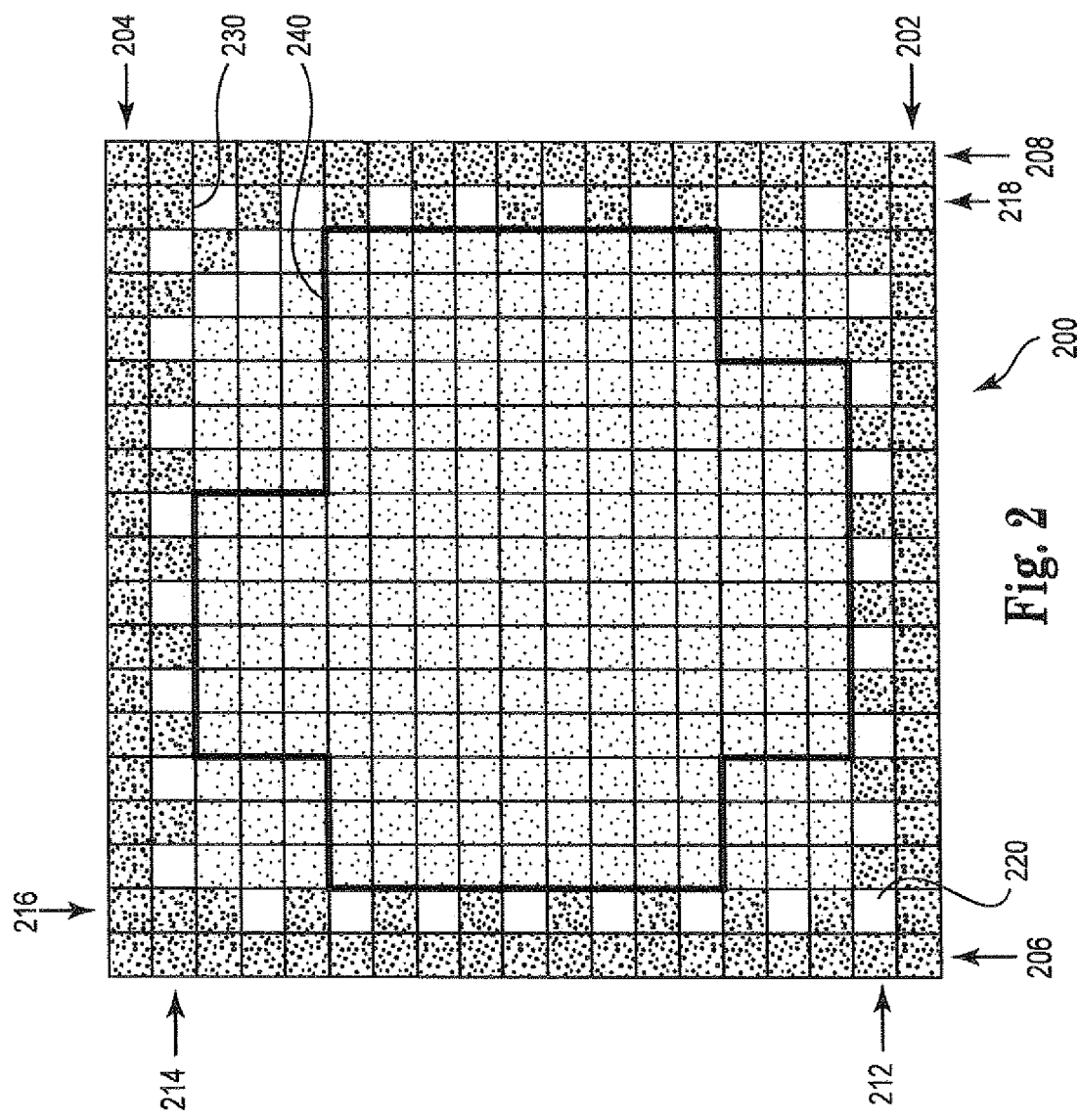
FIG. 2 illustrates a second embodiment of an information symbol showing one embodiment of a main block in accordance with the present invention.

FIG. 2 illustrates one embodiment of an information symbol 200 in accordance with the present invention that is divided into data and non-data areas. In particular, symbol 200 includes four borderlines 202, 204, 206 and 208 which are the outermost lines of cells of symbol 200. All the cells of borderlines 202 to 208 are preferably foreground (black in FIG. 2). Immediately to the interior of borderlines 202 to 208 are tick mark lines 212, 214, 216 and 218. The cells of line 212 to 218 generally alternate from foreground to background color and, thus, each cell is referred to as a tick mark. Tick marks are aligned so that the bottom left corner inside borderlines 202 to 208, shown in FIG. 2 as cell 220 and which may be referred to herein as the reference or origin corner, is background color and the upper right corner inside borderlines 202 to 208, shown in FIG. 2 as cell 230, is foreground color. Starting from cell 220 in the lower left corner, tick marks in alternating colors are placed horizontally along tick mark line 212 and vertically along tick mark line 216. Also, starting from cell 230 in the upper right corner, tick marks are placed in alternating colors horizontally along tick mark line 214 and vertically along tick mark line 218. As is visible in FIG. 2, and depending on whether there is an even or odd number of cells in a given direction in symbol 210, the alteration in color of the tick marks may break down near the corners of symbol 200 adjacent to the corners having cells 220 and 230 and two background color or two foreground color tick marks may appear adjacent to one another. Directly adjacent to and completely surrounding borderlines 202 to 208 is a quiet zone that is the background color and is preferably at least 2 cells wide.

An information symbol in accordance with the present invention may be used in applications wherein other objects or markings are in the vicinity of the symbol. Additionally, as discussed below, a reader or camera used to scan the information symbol will likely not do so in an entirely distortion free manner. And in a reading operation it is important to both be able to identify a target symbol from other objects and marks and be able to read such symbol accurately after identification. The borderlines and quiet zone distinguish the symbol from other objects or marks that may be near a symbol being read. Additionally, as further discussed below, the borderlines can facilitate reconstruction of a damaged symbol or a symbol image that may have picked up noise on reading. The tick marks indicate the position of each cell of the symbol. In this way, a program decoding the information symbol can efficiently locate cell center positions. Because the reference corner (cell 220 in FIG. 2) is always background color and the opposite corner (cell 230 in FIG. 2) is always a foreground color, these corner marks can be used to determine orientation of an information symbol in accordance with the present invention to facilitate more efficient reading.

Preferably, with the exception of the nine-cell square block at the upper right hand corner of symbol 200 having cell 230 at its center, the region at the interior of border lines 202 to 208 and tick mark lines 212 to 218 is referred to as the data area or data zone. As discussed further below, the data zone includes substantive data encoded in the information symbol. Each cell of the data zone can represent one binary digit and may be either background or foreground color depending on the encoded data.

Figure 3:
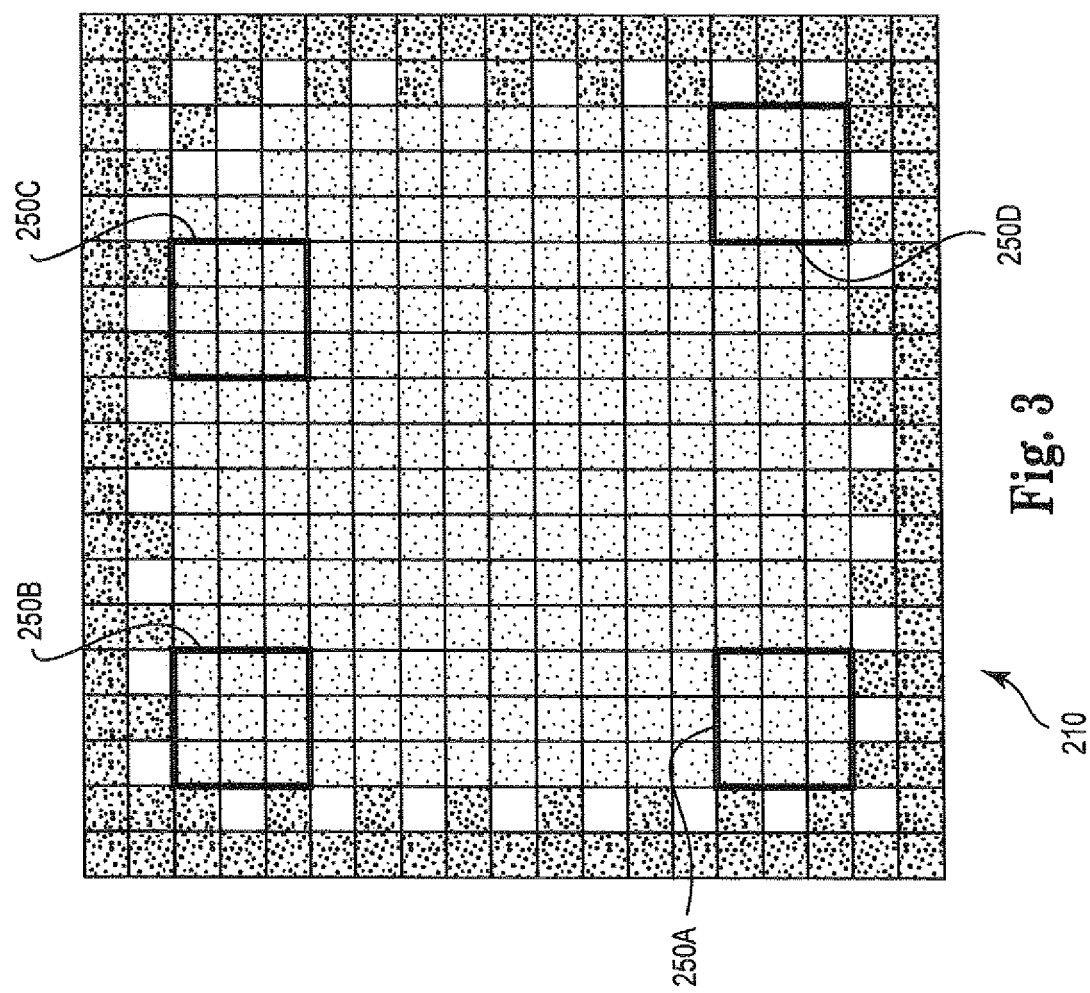
FIG. 3 illustrates the information symbol of FIG. 2 showing one embodiment of descriptor blocks in accordance with the present invention.

The data zone is preferably further divided into a main block and descriptor blocks. FIG. 2 shows the region of symbol 200 that is preferably reserved for the main block 240 of the data zone. FIG. 3 is another illustration of symbol 200 showing the preferred locations of descriptor blocks 250A, 250B, 250C and 250D of symbol 200. As shown in FIG. 2, descriptor blocks 250A to 250D are each square blocks made up of 9 cells in a 3×3 configuration. This is preferably the size and configuration of descriptor blocks for information symbols in accordance with the present invention which horizontal width is 45 or fewer cells. For information symbols in accordance with the present invention having horizontal width of greater than 45 cells, the descriptor blocks are preferably rectangular and made up of 72 cells in a 12×6 configuration. Descriptor blocks are discussed further below.

Main block 240 preferably includes user data, control data and redundant data. User data includes byte string data handled directly by a user application program. Control data can indicate the configuration of the information symbol and is not directly handled by user application programs. As is well understood, redundant data can be calculated from the user data and control data according to Reed-Solomon code rules to provide for error detection and correction. An information symbol in accordance with the present invention preferably uses square, 3×3 blocks of cells to represent single Reed-Solomon symbols. Reed-Solomon symbols are well understood in the art.

The total number of cells in an information symbol in accordance with the present invention can vary depending on the amount of information contained in the symbol. However, because two cells at the beginning and end of any row in either direction are reserved for symbol borderlines (rows 202 to 208 in FIG. 2) and tick mark lines (rows 212 to 218 in FIG. 2), the dimension in cells of a symbol in accordance with the present invention will be 3n+4 in either direction, where n is the number of 3×3 Reed/Solomon symbols extending in the relevant direction.

Figure 4:
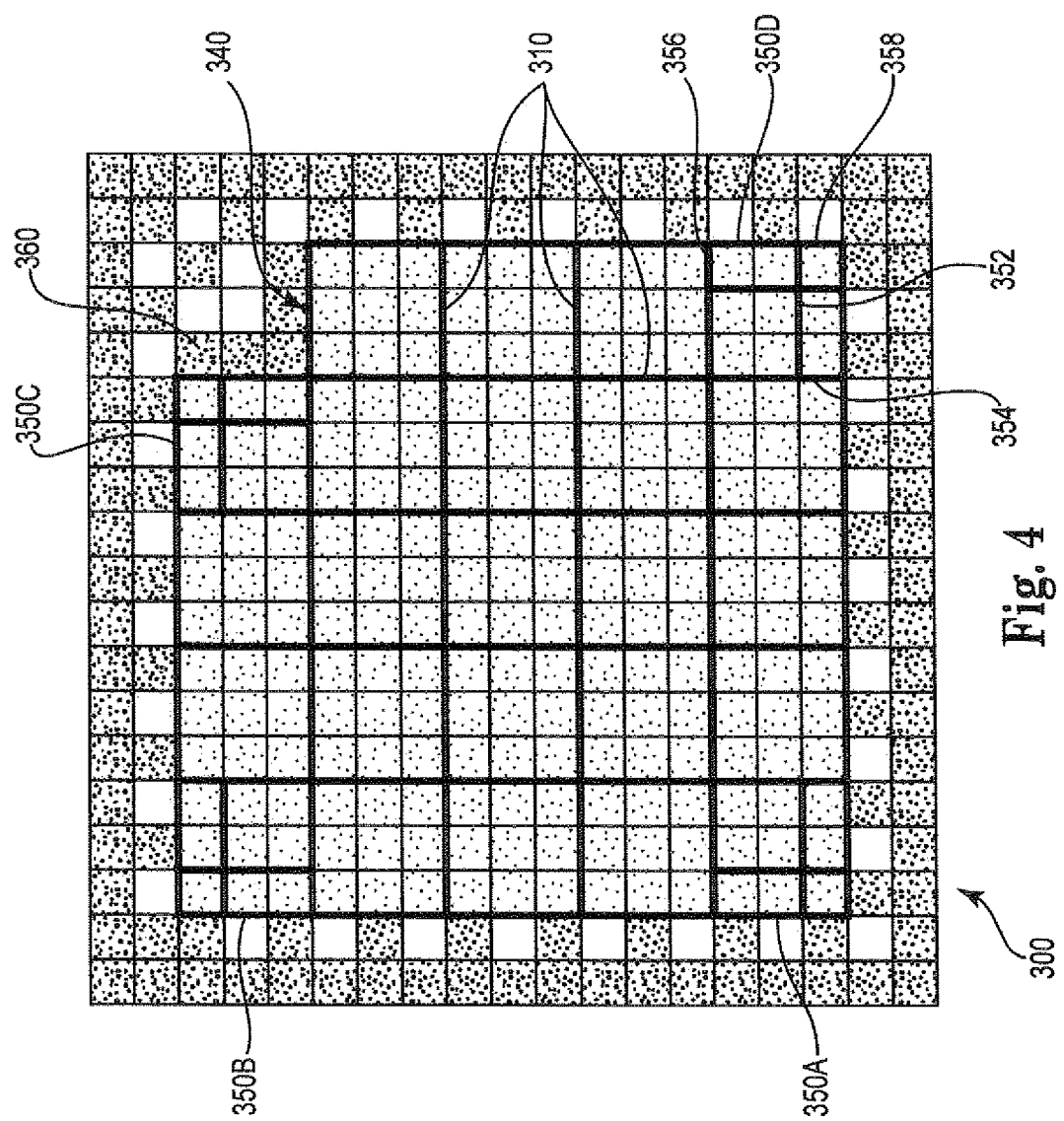
FIG. 4 illustrates the information symbol of FIG. 2 showing one embodiment of Reed-Solomon symbols in accordance with the present invention.

FIG. 4 shows an information symbol 300 in accordance with the present invention. Symbol 300 is a 19×19 cell, square matrix and shows Reed/Solomon symbols 310 in the main block 340 of the data zone of symbol 300 (though not all numbered in FIG. 4, each 3×3 block in data zone 300 is a Reed/Solomon symbol 310). Additionally, information symbol 300 includes descriptor blocks 350A, 350B, 350C and 350D, which, as discussed below, can also preferably be Reed/Solomon symbols. In the embodiment of FIG. 4, each Reed/Solomon symbol 310 is preferably a 3×3 square matrix of cells. The number of 3×3 cell Reed/Solomon symbols in the information symbol is the number of cells in the x direction minus 4 times the cells in the y direction minus 4 divided by 9. Thus, in information symbol 300, there are 19 cells minus 4 in the x direction and 19 cells minus 4 in the y direction which is 15×15=225 cells divided by 9 equaling 25 Reed/Solomon symbols. The total number of Reed/Solomon symbols in a given information symbol can vary depending on the size of the information symbol.

Because each cell in a 3×3 matrix can be either foreground or background color, each 3×3 matrix can represent one of $(2^9-1)$ or 511 Reed/Solomon symbols. Preferably, as well understood in the art, the Reed/Solomon symbols can contain both user data and error correction information. Accordingly, one combination of user data and error correction information that could be contained in the Reed-Solomon symbols used in an information symbol in accordance with the present invention includes user data arranged as 8 bit constructs that provide 256 characters or other binary structures with the remaining space in the Reed-Solomon symbol usable for error correction data. In such an embodiment, the 8 bits of user data can be used in any desired way. For example, user data could also be formatted in 6 bit compressed form. Additionally, user data could represent values in a lookup table providing a set of data having 256 choices such as all the colors a vehicle can be painted or pure binary data such as fingerprint minutia that is specific to a given software application.

In one preferred embodiment, descriptor blocks 350A, 350B, 350C and 350D include 4 bit Reed-Solomon symbols and can be divided as shown in FIG. 4. Reed-Solomon symbols are well understood in the art. In particular, each descriptor block 305A to 350D can include a 2×2 cell block 352, two 2×1 cell blocks 354 and 356 and a single 1 cell block 358. Because in the embodiment shown in FIG. 4, descriptor blocks 350A to 350D can contain 4 bit Reed-Solomon symbols, one such symbol can be located in each of the 4×4 blocks 352, one such symbol can be located in the combination of the two 2×1 blocks 354 and 356 and one such symbol can be located in the combination of four single cell blocks 358 in each of the descriptor blocks 350A to 350D. In one embodiment, descriptor blocks 350A to 350D can hold formatting information about the structure or encoding of symbol 300. Descriptor blocks 350A to 350D can also be reserved for any other purpose. It is also considered that descriptor blocks 350A to 350D could each hold one 3×3 Reed-Solomon symbol or any other size symbol that can be contained in the total number of bits of descriptor blocks 350A to 350D.

Information symbol 300 also includes corner block 360 which may preferably be defined as the 3×3 block of cells which upper right most cell is diagonally adjacent to the upper right corner foreground tick mark. Preferably, this upper right most cell in corner block 360 is foreground color and the center cell of corner block 360 and the cell directly above and to the right of such center cell are background color. Also, the remaining 5 cells of corner block 360 are preferably variable and so may contain data. In one embodiment, the 5 variable color cells of corner block 360 preferably the count of System Information characters. System Information characters can hold information about the use, format, encoding, or other data of symbol 300. Preferably, the System Information characters may be placed at the front end of any user data when such data is encoded.

II. Symbol Encoding

Figure 5:
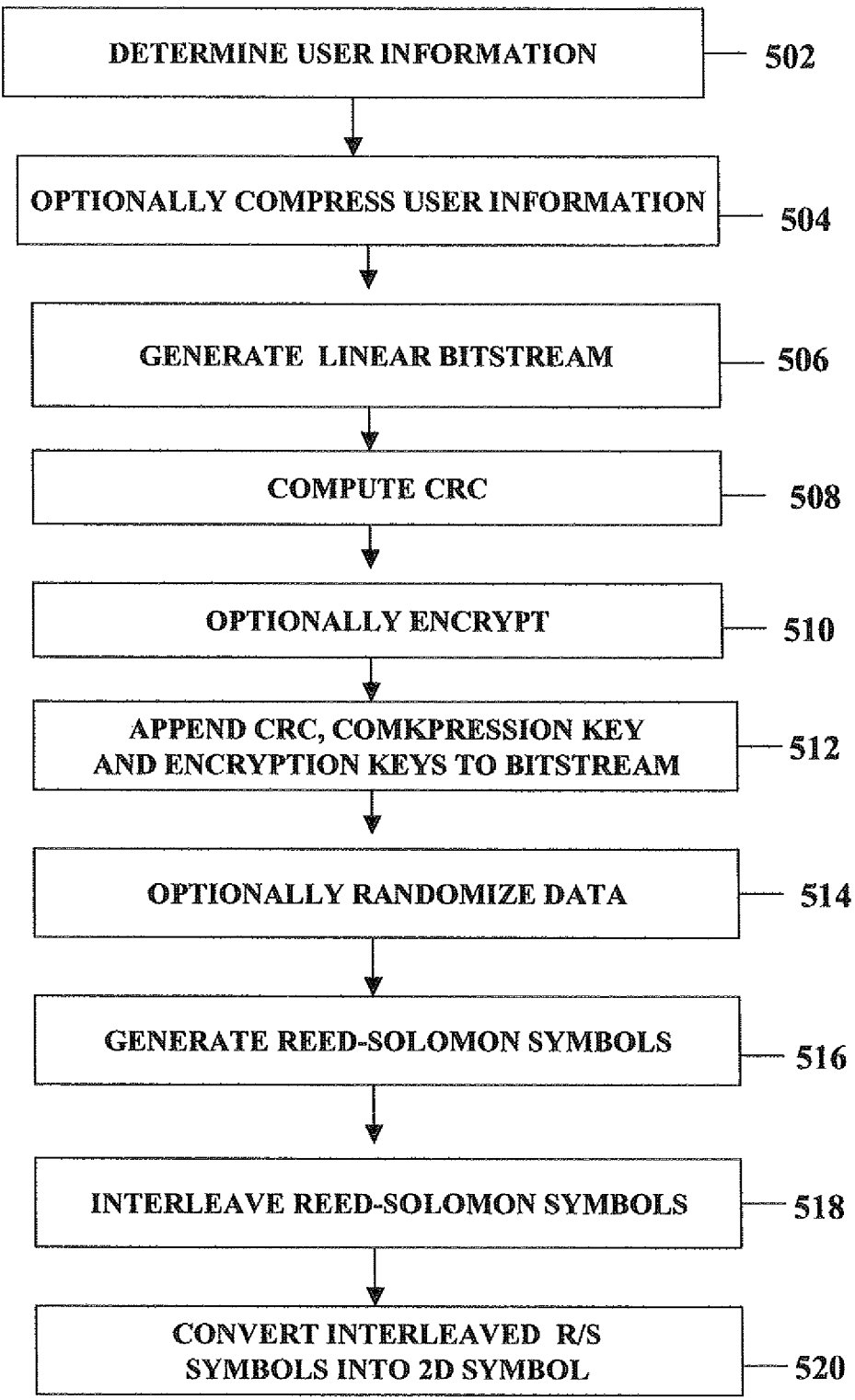
FIG. 5 is a flow chart showing one embodiment of a method in accordance with the present invention of encoding an information symbol.

FIG. 5 is a flow-chart illustrating a method 500 in accordance with the present invention of encoding an information symbol in accordance with the present invention with information. First, in step 502 characters and/or other information to be encoded is determined. Next, in step 504, the user data may optionally be compressed using a compression key as well understood in the art. Next, in step 506, a linear bit stream is generated from the optionally compressed user data. In step 508 a cyclical redundancy check (CRC) is computed in a manner understood by one of ordinary skill in the art based on the linear bit stream. The CRC can later be used to check that information decoded from the information symbol is correct. In step 510, the linear bit stream may optionally be encrypted using an encryption key. Then, in step 512, the CRC is appended to the linear bit stream. Also in step 512, if used, the encryption key and/or compression key may be appended to the linear bit stream so that such keys may be contained in the information symbol itself. In step 514, the linear bit stream may optionally be randomized using a bit mask. Next, in step 516, the Reed/Solomon symbols discussed above are generated based on the bit stream.

In step 518, the bit values from the Reed-Solomon symbols are preferably interleaved so that any damage to the symbol will be distributed across different blocks and, thus, be less likely to render the symbol unreadable. Such interleaving of Reed-Solomon encoded data is well understood in the art. The key for interleaving Reed-Solomon symbols may be a look-up table that provides for the interleaved locations of the contiguous data.

Finally, in step 520, the interleaved bits are preferably then converted into a graphic representation using dark and light squares. Such encoding processes are well understood in the art. The portions of the graphic representation including user data, control data and redundant data are located in the data zone of an information symbol in accordance with the present invention. Graphic representations of information describing information symbol formatting are located in descriptor blocks of the information symbol.

Preferably, the method of FIG. 5 is carried out on data included in the main block of the data zone along with the corner block of an information symbol. This same process is preferably carried out separately on for the data included in the descriptor blocks of an information symbol.

III. Symbol Reading and Decoding

Figure 6:
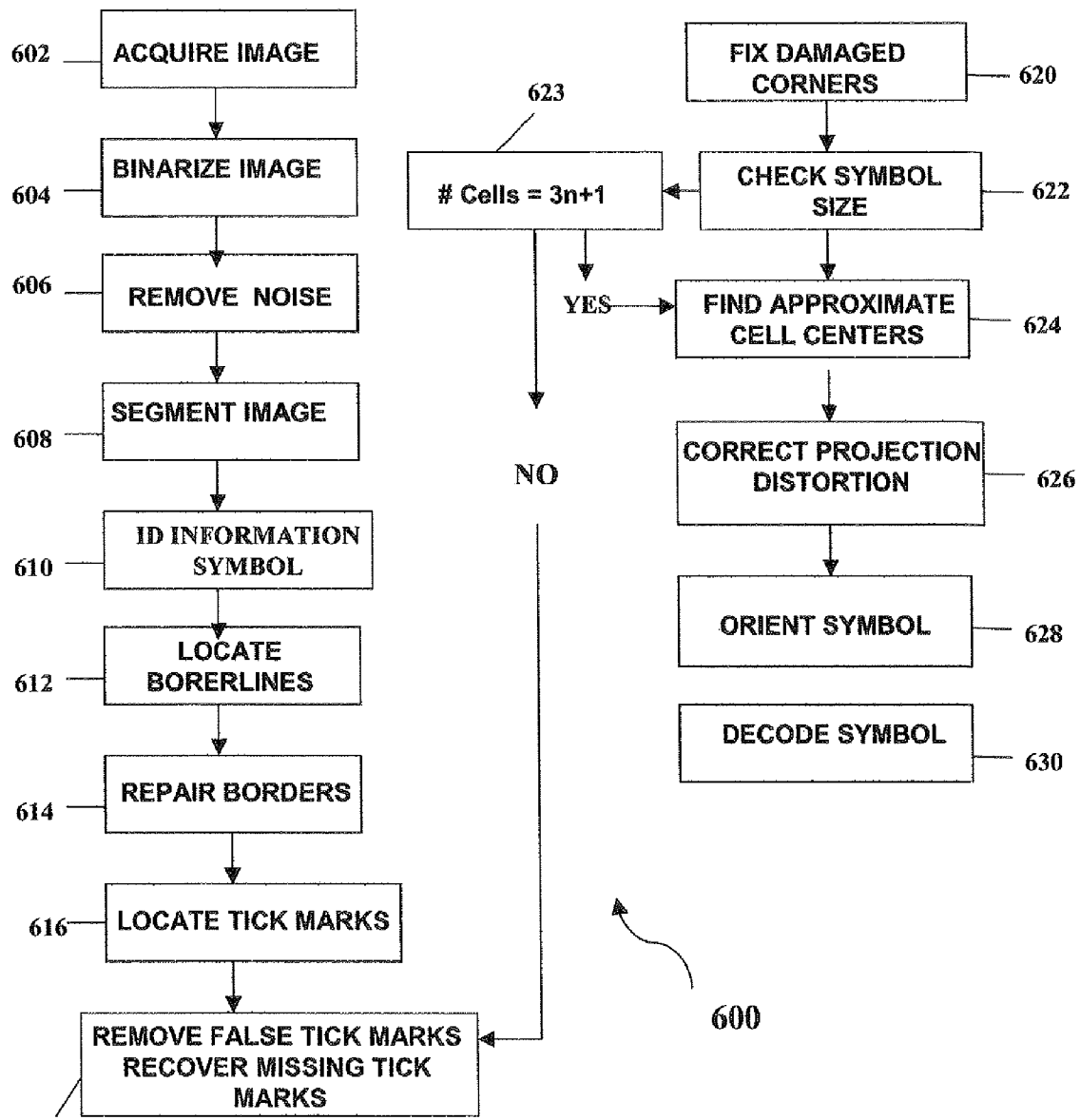
FIG. 6 is a flow chart showing one embodiment of a method in accordance with the present invention of reading an information symbol.

FIG. 6 is a flow chart illustrating one embodiment of a method 600 in accordance with the present invention for acquiring and reading an image of the information symbol to be read.

Acquiring an Image

First, in step 602 of method 600, the object having the information symbol to be read is photographed or otherwise scanned to generate a raw image thereof. This raw image is then pixilated using techniques understood by one of ordinary skill.

Image Binarization

Next, in step 604 of method 600, the image is preferably binarized. As understood by one of ordinary skill, the software used to scan and generate a raw image of the object having the information symbol may be configured to filter the raw image to indicate an area of interest on the scanned object that contains the information symbol. If this region of interest in the raw image is not defined, the entire image is subject to binarization and the entire image will be considered the region of interest. If such region of interest is defined then the binarization may be more accurate and is not affected by whatever noise or objects that reside in the rest of the image. If a region of interest is defined the image processing operation, including binarization, can be relatively faster than in a case where a region of interest is not defined because a relatively smaller portion of the image may be processed.

Figure 7:
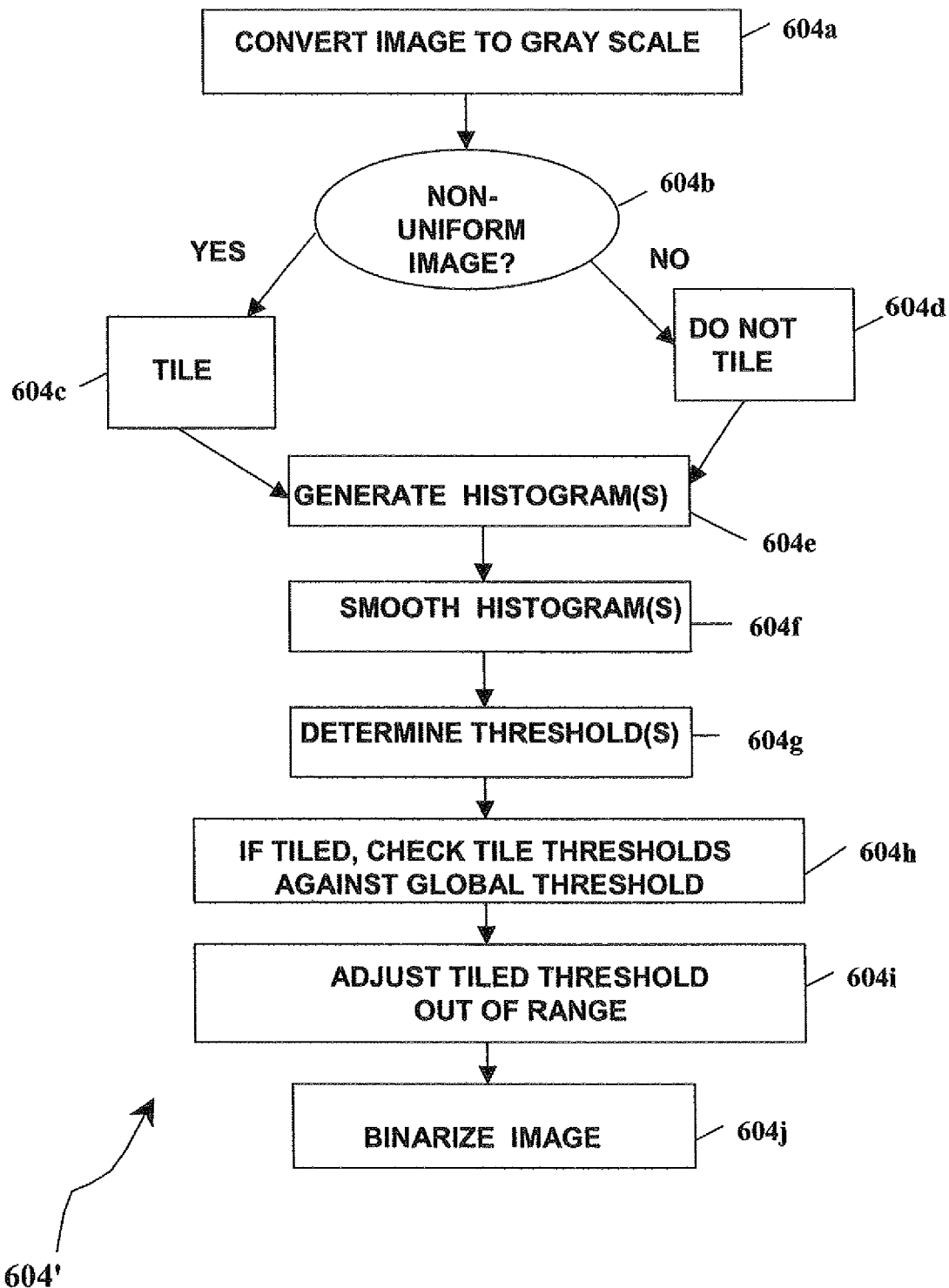
FIG. 7 is a flow chart showing one embodiment of a method in accordance with the present invention of binarizing an image of an information symbol.

FIG. 7 is a flowchart showing one embodiment of a method 604' in accordance with the present invention of binarizing an acquired image including an information symbol. First, in step 604a of method 604', if the image is not in grayscale, it is converted into grayscale. The background of such a grayscale image, however, may be non-uniform due to uneven lighting when generating the raw image. This may happened if the source of light of the camera or other scanner is not placed vertically above the scanned object and the some areas of the object gets less illumination than the areas closer to the light source. This may not be much of a problem in flatbed scanners where illumination is relatively even over the entirety of a scanned object.

However, if the background of a raw image is non-uniform, global image thresholding for binarization may not work. Thus, in step 604b, it is determined whether the grayscale image is uniform enough to apply global thresholding. If there is sufficient non-uniformity in the grayscale image, establishing localized thresholds for smaller regions may be preferable. Thus, in step 604c The raw image is divided dynamically into a tiles of substantially equal size. Generally, relatively smaller sized tiles are used for relatively smaller images and relatively larger size tiles are used for larger images. If the size is too small, a small background region may end up being converted to foreground and vice versa. If the size is too big, the problem of the global threshold will still exist. Depending on the size of the raw image, it may be divided into anywhere from around 3×3 tiles to around 30×30 tiles (though the tiles need not be square). If in step 604b it is determined that the grayscale image is uniform enough for global thresholding, in step 604d it is determined that the image should not be tiled.

The discussion below regarding steps 604e, 604f and 604g will refer to the operation in each tile if the image is tiled or the operation in the global image if the image is not tiled. The threshold is a value between 0 and 255. To calculate the threshold, in step 604e, a histogram of the grayscale values from 0 to 255 versus the number of the pixels of the raw image (or region of interest of such raw image, if such region is defined) at a given grayscale value is generated. Such histograms will generally have a number of local maxima.

Accordingly, in step 604*f*, the histogram is smoothed. Smoothing the histogram can be carried out using any known method. One such method is to assume a first set of maxima in the histogram are related to foreground pixels and a second set of maxima are related to background pixels. One way this assumption could be made is to move along the curve of the histogram averaging subsequent local maxima whenever they are encountered until only two local maxima remain.

Figure 8:
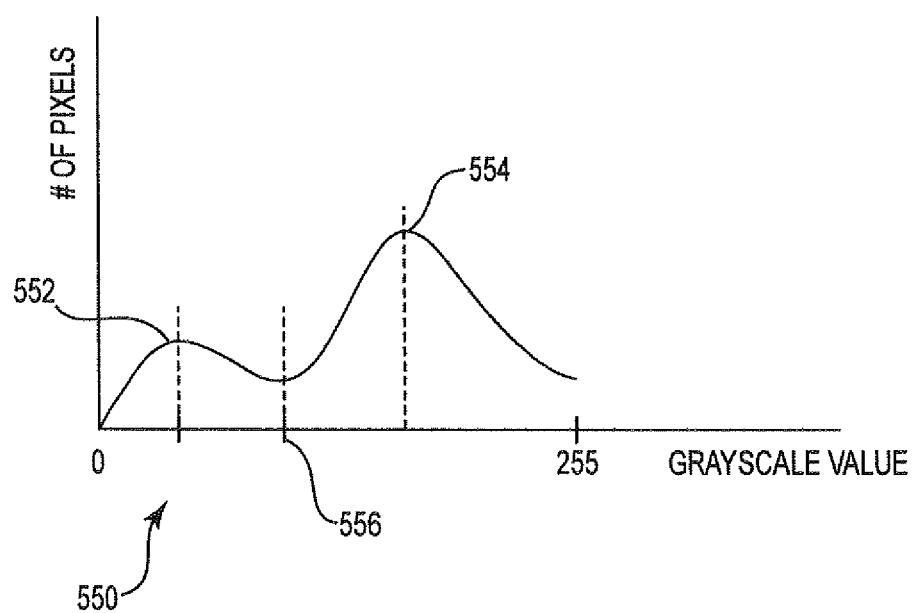
FIG. 8 is a graph showing one embodiment of a smoothed histogram for binarizing an image of an information symbol in accordance with the present invention.

Ideally, such a smoothing operation will result in a histogram having only two local maxima (the foreground maximum and the background maximum) with a local minimum therebetween. FIG. 8 illustrates a histogram 550 that may result from this smoothing process. Histogram 550 is a graph of the grayscale value from 0 to 255 of pixels in a pixilated raw image versus the number of pixels at each grayscale value that has then been smoothed and summed as described above. As shown, this process can result in fording two localized maxima, the threshold for a tile, or for the entire pixilated image if tiling is not done, is taken to be the grayscale value of the local minimum 556 between the two local maxima 552 and 554.

In step 604*h*, if the pixilated raw image is tiled, preferably, each tile threshold is checked against a global threshold calculated in the above manner for the entire raw pixilated image. In step 604*i*. If the global threshold is outside of a predetermined range from one or more tile thresholds, then the one or more tile thresholds are reset inside the global threshold range. If a given tile threshold is above the upper limit of the global threshold range, the tile threshold is dropped until it is inside the range. If a given tile threshold is below the lower limit of the global range, the tile threshold is raised until it is inside the range.

In step 604, the image is binarized. In particular, if the raw pixilated image is tiled, the tile thresholds as determined above is applied to the pixels of the corresponding tile. If a pixel is below the threshold, the pixel is designated background, if a pixel is above the threshold, it is designated a foreground pixel. Since the original pixiliated, grayscale image is not needed anymore, the image or region of interest may, though need not, be binarized in place and the original raw image is overwritten by the binarized image to save memory and time.

Use of an initialization file can increase the processing speed in decoding a scanned information symbol. Such initialization file may be called by the software program imaging and/or decoding the information symbol and can provide information on the format and structure of an associated information symbol. Without limitation, information that may be included in an initialization file can include the location on an acquired image of a region of interest in which the information symbol to be read will be found, size of the symbol, number of pixels per cell of the symbol, approximate rotation of the symbol in the image. Some of these values may be difficult to accurately determine by processing the image and fore-knowledge of these values can make the image processing values both faster and more accurate.

It is to be understood that the method of binarizing an information symbol in accordance with the present invention discussed above can be applied to any information symbol using a matrix of data cells.

Noise Removal

In step 606 of method 600, some types of noise are removed from the image. In particular, the acquired raw pixilated image may end up having some noise caused by camera electronics creating black or white pixels that are artifacts of electrical noise rather than true data pixels. This type of noise is often referred to as salt and pepper noise. Other types of noise in image acquisition may also cause this type of false creation of black or white pixels. Accordingly, a majority filter may be used to remove the salt and pepper noise. Majority filters are well understood by one of ordinary skill in the art.

Image Segmentation into Different Objects

As discussed above, the acquired image may include objects other than the information symbol to be decoded. Thus, in order to locate the symbol, in step 608 the image may be segmented into different objects. This step may not be necessary if a region of interest in which the information symbol should be found was previously designated (for example, in an initialization file as discussed above). If no region of interest is designated the binarized image is segmented into components having touching foreground pixels. That is, it is assumed that areas that are not connected to each other with foreground pixels but having bursts of touching foreground pixels within the areas are likely to be separate objects (e.g. an ID photo, text information, etc.).

Identification of the 2D Barcode Symbol Among the Objects

Figure 9:
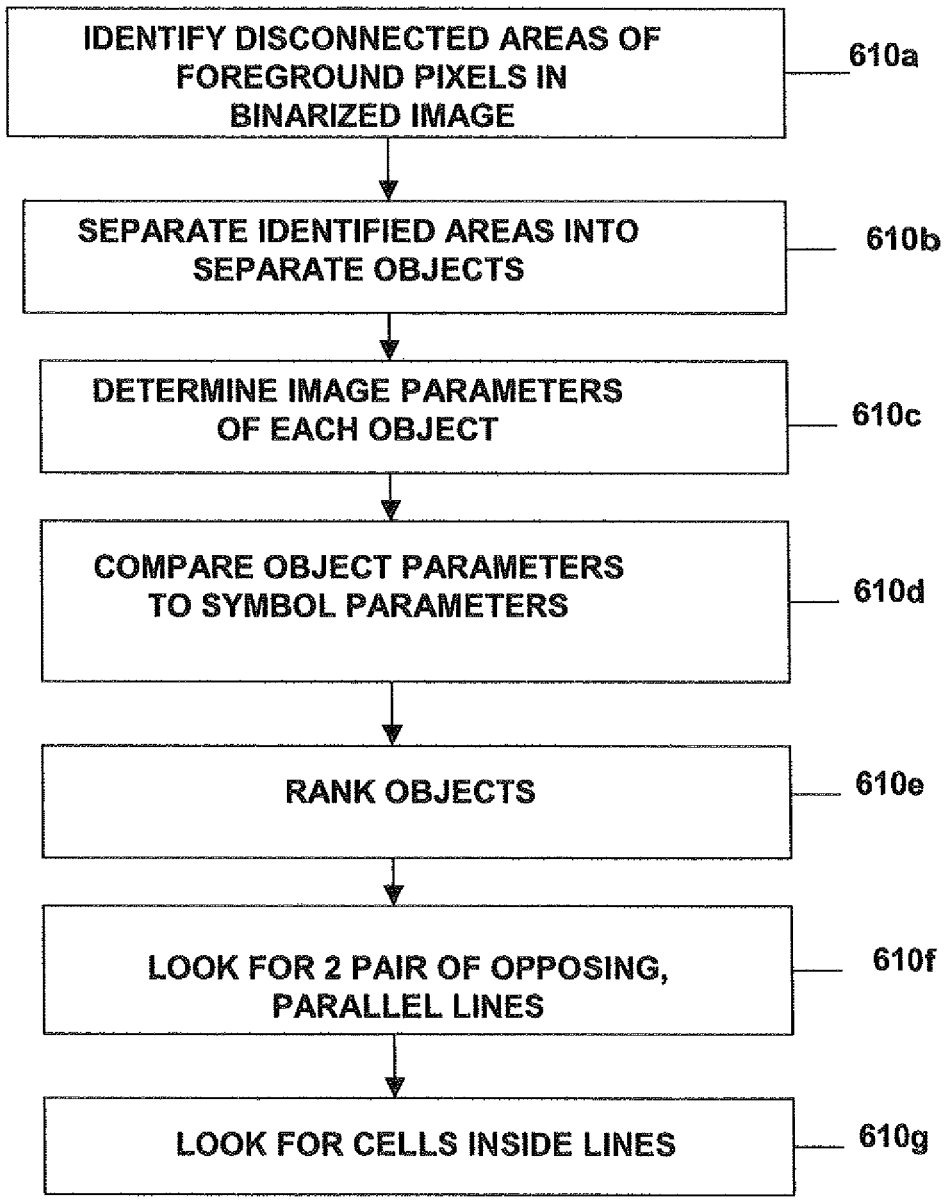
FIG. 9 is a flow chart showing one embodiment of a method in accordance with the present invention of locating an image of an information symbol among other objects.

After segmenting the region of interest into several objects, in step 610 the object that forms the 2D barcode symbol are identified if such a symbol exists in the region. FIG. 9 is a flow chart showing a process in accordance with the present invention for identifying an information symbol among the located objects in a binarized image. In steps 610*a* and 610*b*, discussed above, areas of touching pixels are located and the candidate objects are identified in the binarized image. In step 610*c*, parameters of the identified objects are determined. In particular, data including, without limitation, the number of pixels in an area, dimensions and aspect ratio of the area and density of foreground cells are determined for each identified object. Then, in step 610*d*, these parameters for each object can be compared to such parameters applicable to an information symbol that is being searched for. For example, the dimensions, aspect ratio and number of pixels of an object in the binarized image are determined. These parameters are each compared to the same parameters that would be expected of an information symbol. In step 610*e*, based on the outcome of these comparisons, the objects in the binarized image are ranked in order of most to least likely to be an information symbol.

Figure 10A:
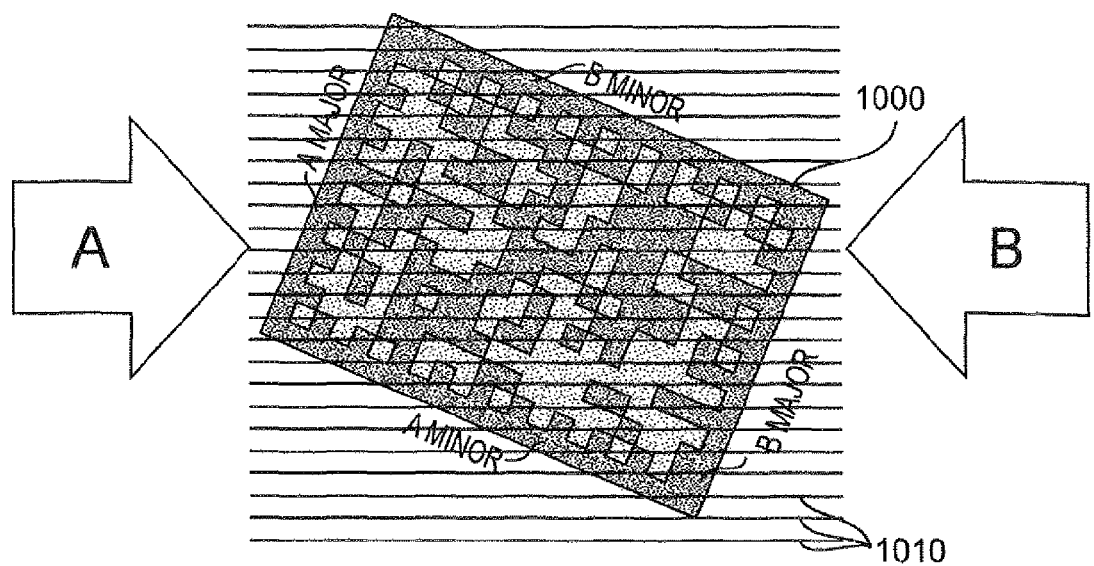
FIGS. 10A and 10B are illustrations of an information symbol showing how borderlines of such information symbol may be found in one embodiment of a method in accordance with the present invention.
Figure 10B:
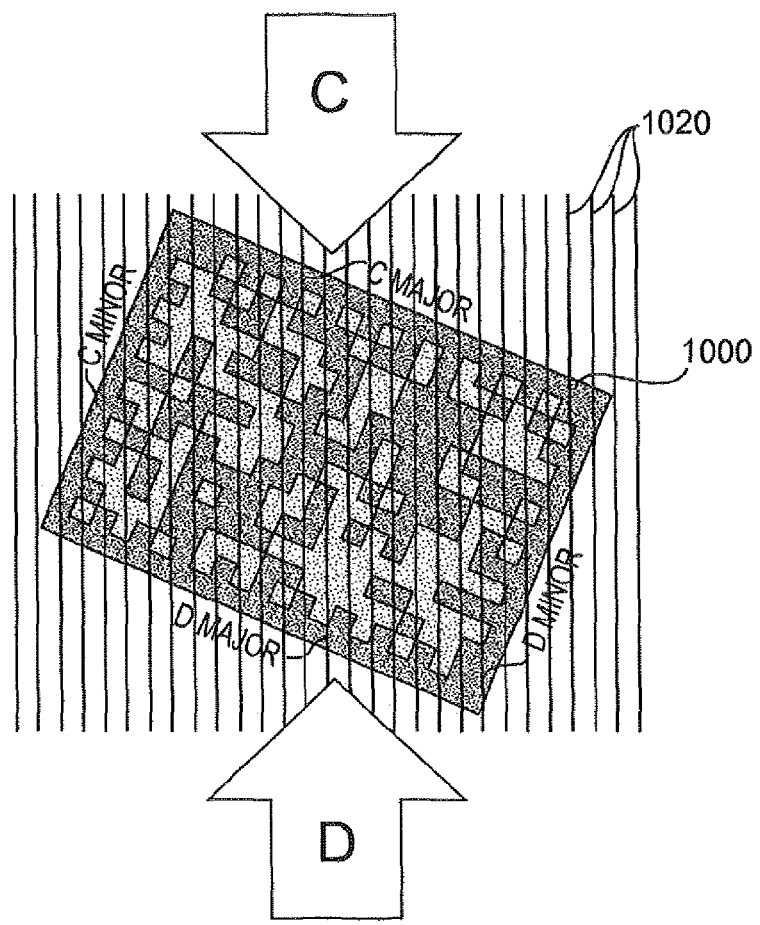

As discussed above, an information symbol in accordance with the present invention preferably includes four, solid borderlines. Accordingly, after ranking, in step 610*f* the top ranked object is preferably examined to determine if there are 2 pairs of opposing, parallel, or nearly parallel, lines that would form the four borderlines. In one embodiment, this is done as shown in FIGS. 10A and 10B. FIG. 10A shows an information symbol 1000 in accordance with one embodiment of the present invention. To determine if symbol 1000 includes a first pair of parallel lines, scans of pixels are taken along parallel scan lines 1010. Such scans are taken across symbol 1000 first in the direction of arrow A from the A major edge of symbol 1000 and second in the direction of arrow B from the B major edge of symbol 1000. What is looked for is two sets of connected pixels that may or may not be in the direction of scan lines 1010, but must be connected substantially along some given direction and the connected pixels of each set should be along substantially the same direction. Additionally, the connected pixels should have some predetermined thickness.

A similar process is carried out as shown in FIG. 10B, with scans of symbol 1000 taken in the direction of arrow C along scan lines 1020 and scans taken in the direction of arrow D along scan lines 1020. As described with respect to FIG. 10A, the scans looks for two sets connected pixels, the connected pixels of each set along substantially the same direction and having a predetermined thickness.

If such lines of connected pixels are found, in step 610g, the region at the interior of the lines is examined. This examination looks for a predetermined quantity of substantially uniform transitions from foreground to background cells and back again as would be found in an information symbol in accordance with the present invention. If such transitions are found, then the object will be further examined as a possible information symbol.

Once the best candidate for the information symbol is identified in the binarized image, to accurately read and decode the information symbol in accordance with the present invention, the center of each cell in the data zone of the symbol is preferably located. This is because it is assumed that the best indication of the color of any cell will be given at the center of the cell. By doing so, the likelihood of correctly determining the color of each cell, and thus accurately decoding the cell, can be increased. To locate the center of each cell of the data zone, preferably the location of the corners of the symbol are determined. And, in order to locate the corners, the borderlines and tick mark lines are preferably first found.

Finding the Solid Sides of the Symbol

Figure 11:
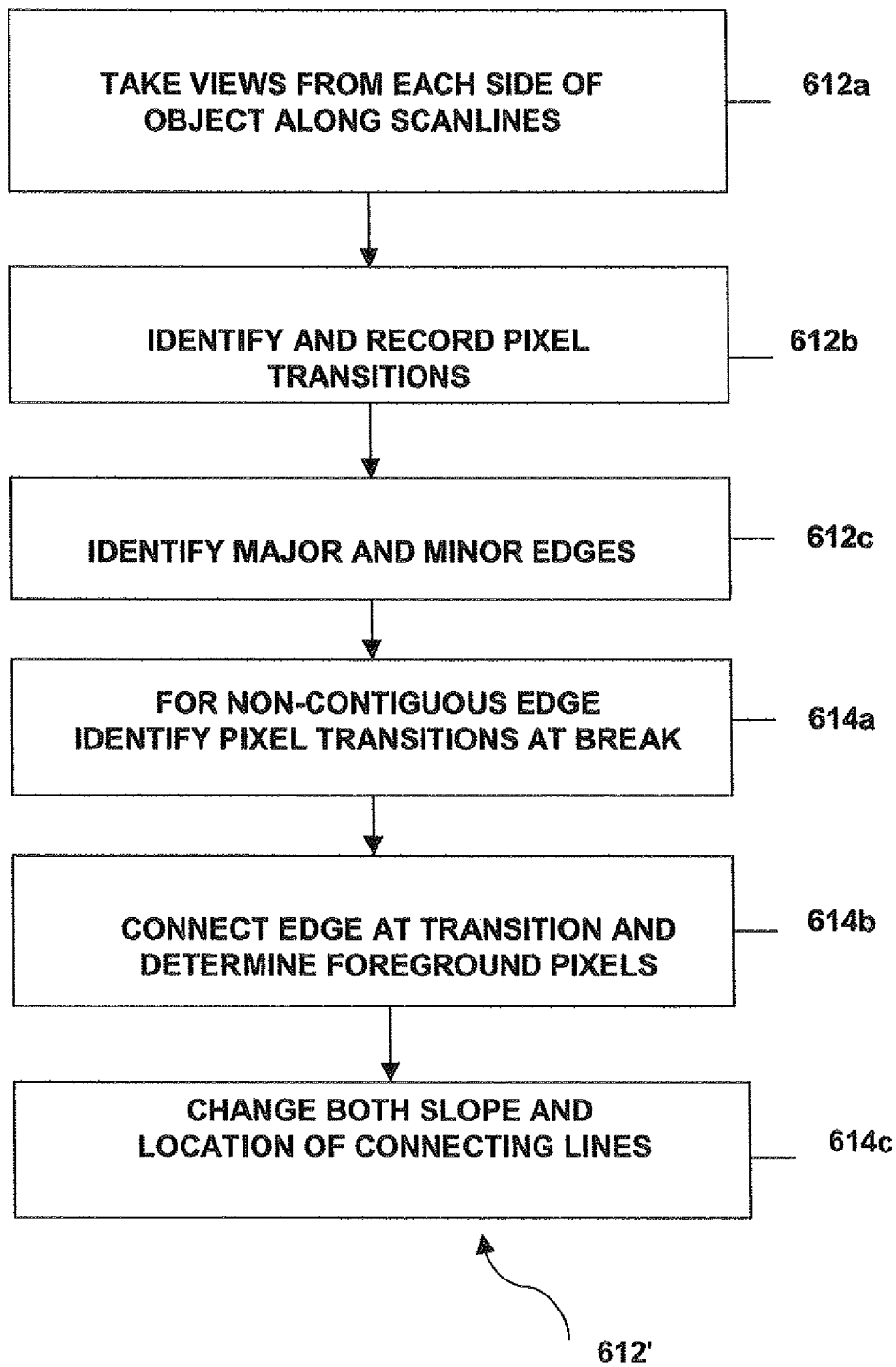
FIG. 11 is a flow chart showing one embodiment of a method in accordance with the present invention of identifying borderlines of an information symbol.

Once the candidate object is selected, in step 612, the four lines making the solid borderlines (e.g. borderlines 206, 208, 212 and 214 in FIG. 2 or the major and minor edges shown in FIGS. 10A and 10B) are found and defined. Such borderlines are defined as the most outside group of contiguous foreground cells for each of the four sides of the information symbol. FIG. 11 is a flowchart illustrating one method 612' of finding solid borderlines of the symbol in accordance with the present inventions. To define the borderlines, the selected object is examined as described above and shown in FIGS. 10A and 10B. In particular, in step 612*a* of method 612', views of the object are taken in the directions of arrows A and B along the parallel scan lines 1010 of FIG. 10A and in the directions of arrows C and D along parallel scan lines 1020 of FIG. 10B. In step 612*b*, views along a scan line look for the first transition of background pixels to foreground pixels and then the next foreground pixel to background pixel transition. The location of each transition and number of pixels between transitions is recorded for each of the four views along arrows A, B, C and D.

In step 612*c*, in each of these four views, the borderline that has the larger number of transitions is called the major edge and the other borderline is called the minor edge. For example, looking in the direction of arrow A in FIG. 10A, edge A major makes transitions along 13 scan lines 1010 while edge A minor makes transitions along only 7 scan lines 1010. Where the major and minor lines in a given view intersect in a corner that is the nearest point to an image side for that view.

Fill in Missing Sections of Borderlines

In one embodiment, it may be the case that in identifying borderlines, no entirely contiguous line may be found for a major borderline. Step 614 is focused on filling in such non-contiguous lines. In such a case, as shown in steps 614*a* and 614*b* of FIG. 11, the background pixel to foreground pixel and foreground pixel to background pixel transitions at the edges of the discontinuity in a borderline can be joined with a line and then it can be determined how many foreground pixels fall on such line. Then, in step 614*c*, this process can be repeated by moving both the location and slope of the drawn line until all the pixels found along the line are foreground pixels. If more than one such lines are found, such multiple lines can be averaged to fill in the discontinuity. Any other suitable line repair algorithms may also be used to complete a non-contiguous borderline.

Additionally, because each borderline has an opposite borderline that is of equal length, if the length of a borderline opposite to the non-contiguous borderline is know, the non-contiguous borderline may be extended to match the length of the opposite, in-tact borderline, by adding cells to the non-contiguous borderline.

Locating Tick Marks

Figure 12:
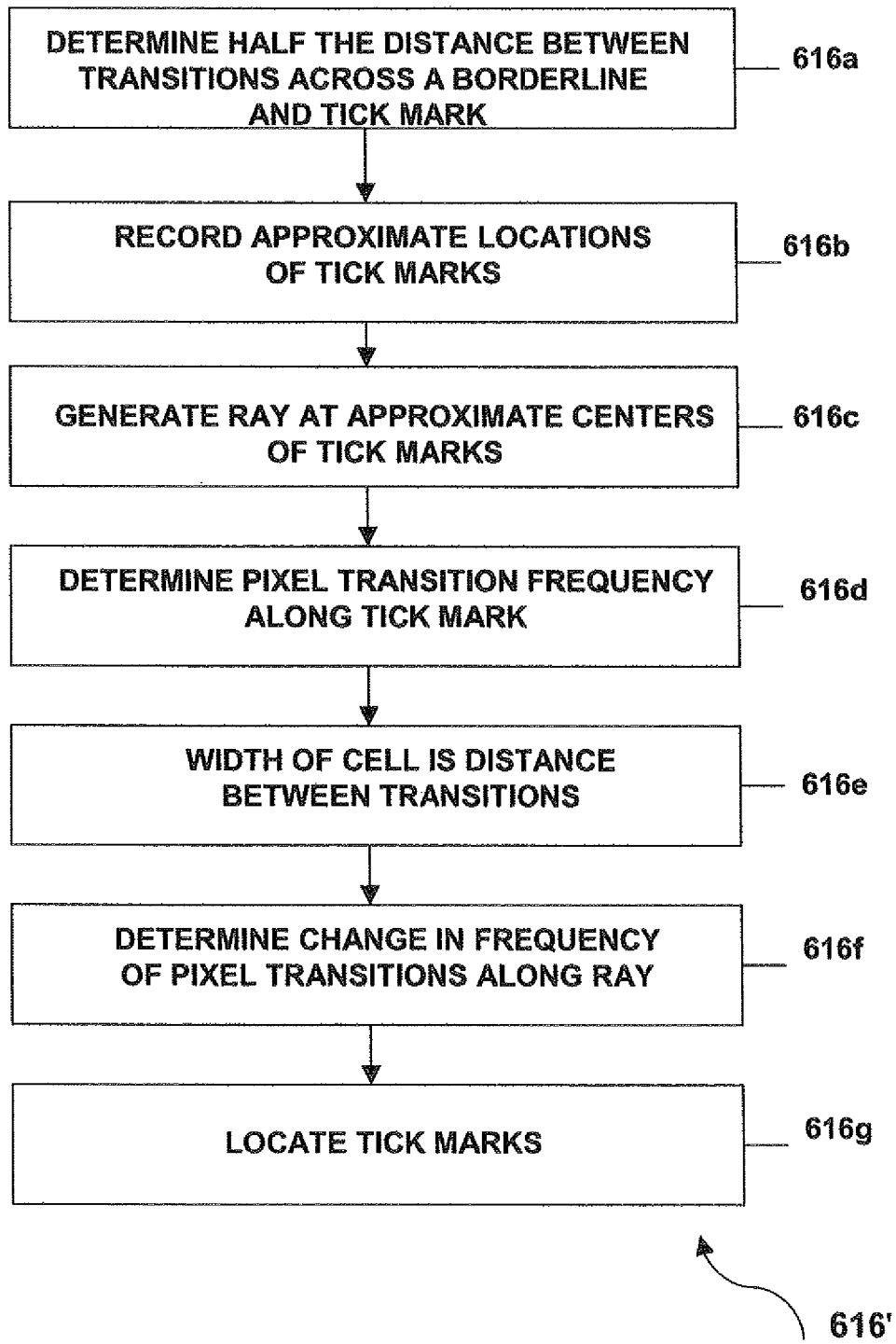
FIG. 12 is a flow chart showing one embodiment of a method in accordance with the present invention of locating tick marks in an information symbol.

After identifying the borderlines of the symbol, step 616 is focused on finding the foreground and background tick marks at the interior of the borderlines. FIG. 12 is a flow chart illustrating one embodiment of a method 616' in accordance with the present invention for locating tick marks of an information symbol. As discussed above, the locations and number of pixels between background to foreground pixel transitions and subsequent foreground to background pixel transitions along scanlines passing through the selected object are recorded. And, as also discussed above, the structure of an information symbol in accordance with the present invention includes alternating foreground and background tick marks of cell dimension along the interior of each borderline. Thus, where there is no tick mark, the recorded distance between pixel transitions will indicate the thickness of a borderline and where there is a tick mark, the recorded distance between pixel transitions will indicate the thickness of a borderline plus a tick mark. Accordingly, in step 616*a* of FIG. 12, half of the larger of these two distances (that is, the distance between transitions where there is a tick mark) is determined and this is taken as a first approximation of the thickness of one cell, which is equivalent to the thickness of the borderlines or thickness of the tick marks. Then, in step 616*b*, the number of positions along each of the borderlines where there is a tick mark (as indicated by approximately twice a cell width distance between transitions) and where there is not a tick mark (as indicated by approximately a cell width distance between transitions), is recorded.

Because the symbol is most likely skewed, measuring the horizontal and vertical widths of the symbol borderlines and tick marks may not reflect the actual cell width. To more accurately determine cell width, in step 616*c* of method 616', a first borderline is selected and a ray is constructed a distance of approximately half the approximated width of a cell from the inside edge of the borderline and substantially parallel to the borderline. Then, in step 616*d*, the frequency of background to foreground and foreground to background transitions along this ray is determined. Because the ray is substantially parallel to a borderline, the distance between pixel transitions will give the approximate width of a cell. Thus, in step 616*e*, the approximate width of each cell is determined. Additionally, due to projection distortion, discussed below, this frequency will general increase as the position on the ray moves towards a far side of the symbol image. The increase in this frequency can be used as a correction factor as a first approximation to account for projection distortion when determining center locations of tick marks discussed below. Thus, in step 616*f*, the change in frequency of pixel transitions along a ray is determined and recorded.

In step 616*g*, by using the number and widths of tick marks determined above, the locations of the tick marks along the borderlines is determined. However, it may be the case that some tick marks are damaged or additional tick marks may have been added. Accordingly, the number of tick marks along each borderline is preferably determined. As discussed above, opposite tick mark lines must include the same number of tick marks which must also equal 3n+4, where n is an integer. If this criteria is not met, then in one embodiment, is may be assumed that there are damaged or extra tick marks along one or more borderlines which must be repaired or removed.

After finding the number, width and location of tick marks as discussed above, it may be possible to go back and repair any remaining, incomplete borderlines. In particular, either the two opposing horizontal borders or vertical borders are looked at. If one of the two borders has a break in it, the number of tick marks along the opposite, in tact border is determined as discussed above. Then the size of the tick marks along the damaged border is determined. Finally, because as discussed above, each border has the same number of tick marks along its interior edge, the damaged border is extended so that the final length is equal to the size of the tick marks along the damaged border times the number of tick marks along the un-damaged border. This operation can then be carried out on the other, opposing pair of borders if necessary. Inclusion of tick marks along all four borders advantageously makes this relatively efficient reconstruction of symbol borders possible.

Removing the False Tick Marks and Recovering the Missing Tick Marks

As noted above, due to scanning problems, binarization problems, noise, and other factors, some of the foreground tick marks found in step 616 may end up being missing or false tick marks may be generated. Accordingly, in step 618 of method 600, spurious tick marks are removed and missing tick marks are added.

Figure 13:
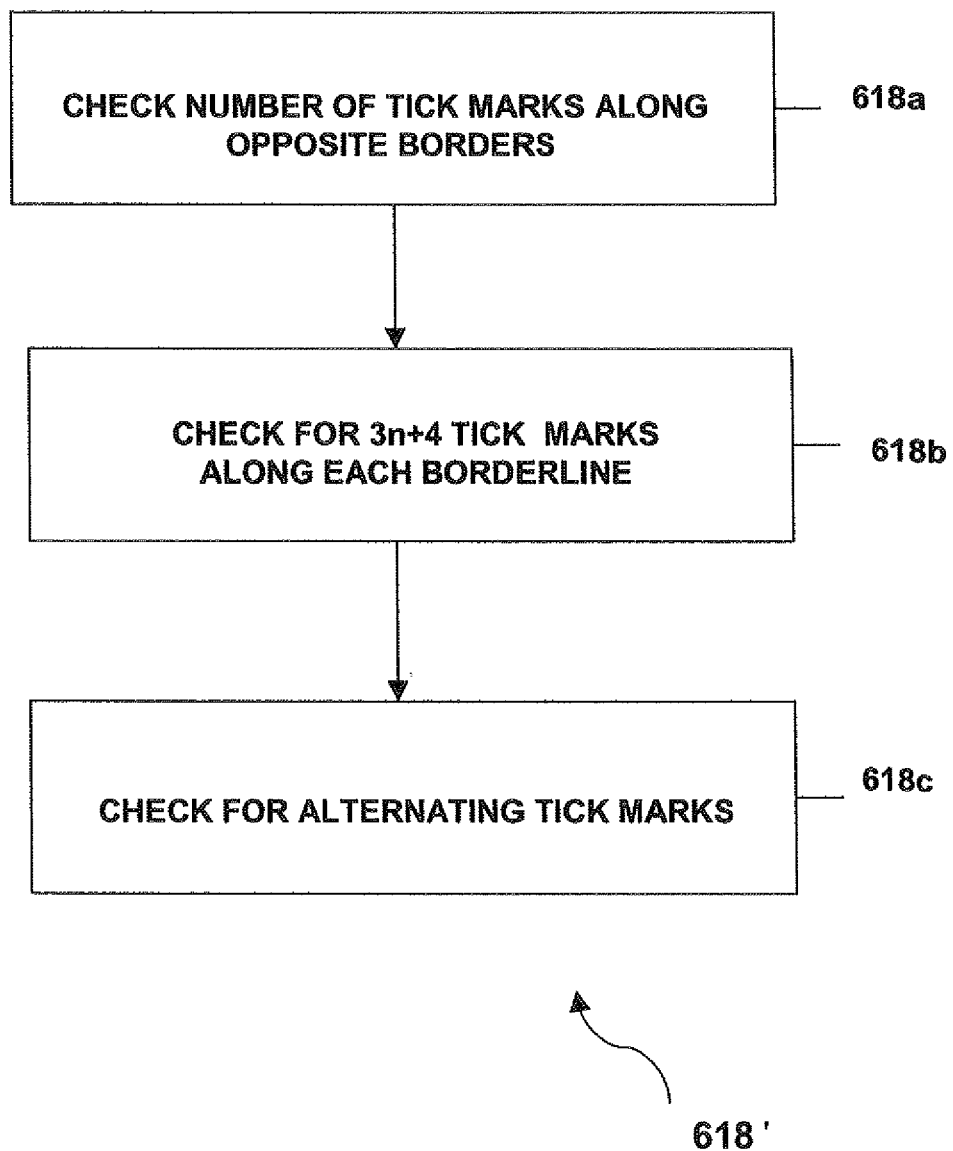
FIG. 13 is a flow chart showing one embodiment of a method in accordance with the present invention of determining if there are false or missing tick marks in an image of an information symbol.

FIG. 13 is a flowchart illustrating one embodiment of a preferred method 618' of locating missing or false tick marks in an information symbol in accordance with the present invention. Because both interior edges of two opposite border lines include tick marks, in determining if there are missing or false tick marks along a first borderline step 618a of method 618' is to check the number of tick marks along the opposite borderline. Thus, if a corner is missing along a first borderline, and not the opposite borderline, it is likely that the opposite borderline includes the correct number of tick marks and this number can be matched in along the first borderline. If, however, it's not clear which borderline has the incorrect number of tick marks, in step 618b, the dimension of each borderline, which must be 3n+4 cells, where n is and integer number of Reed/Solomon symbols in the information symbol, can be checked. If one borderline includes an acceptable number of cells and the other does not, then tick marks along the incorrect borderline can be added or subtracted as necessary and using size and location data from adjacent, known good tick marks.

Additionally, as discussed above, tick marks are inserted along borderlines in a alternating manner starting from a lower left corner foreground tick mark and an upper right corner background tick mark. Thus, in step 618c, if a borderline has adjacent tick marks that do not follow this convention, tick marks may be added or removed as necessary to enforce this convention.

Fixing the Damaged Corners

As noted above, a part of a method of decoding an information symbol in accordance with the present invention is to locate the corners of the symbol. However, one or more corners of the symbol may be damaged either in the scanning process or on the scanned object itself. Accordingly, in step 620 of method 600, damaged corners are preferably repaired.

Figure 14:
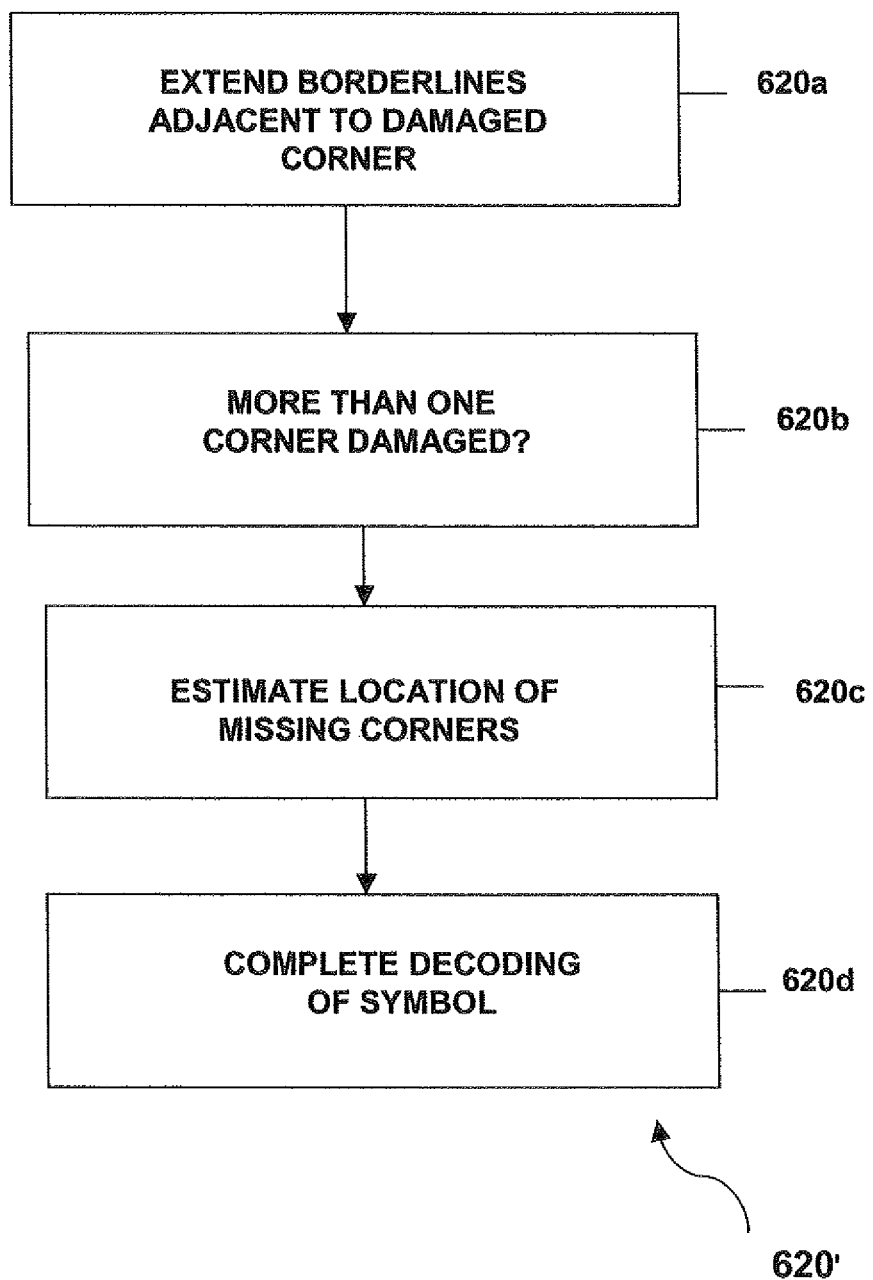
FIG. 14 is a flow chart showing one embodiment of a method in accordance with the present invention of fixing damaged or missing corners of an information symbol.

FIG. 14 is a flowchart illustrating one embodiment of a preferred method 620' in accordance with the present invention of fixing damaged corners of an information symbol. If two adjacent borderlines do not end in a common apex, the corner where that apex should be may be missing or damaged. To reconstruct it, in step 620a of method 620', the borderlines adjacent to the damaged or missing corner are extended until they cross and the tick mark lines along each borderline are also extended based on the length of the corresponding borderlines which adjacent corner is not damaged. This process will locate the missing corner. In step 620b of method 620' it is determined if more than one corner is damaged. If this occurs, then in step 620c, it is estimated where the actual missing corners might be located. Then, in step 620d, the reading and decoding steps, described further below, are completed to see if the information symbol can be read. If not, different locations for multiple missing corners can be estimated and the process can be repeated.

Checking Number of Symbol Rows and Columns

As discussed above, the size of a symbol in accordance with the present invention must be 3n+4, where n is the number of Reed-Solomon symbols in the information symbol along either the length or width of the symbol. In steps 622 and 623 of method 600, the located information symbol is checked to see if this rule is followed. The number of rows and columns in the information symbol can be determined by counting the number of tick marks along a given border line, as discussed above. If this rule is violated, then the number of rows or column of the information symbol may be adjusted as discussed above by adding or removing tick marks. If this rule is not violated, then the approximate location of cell centers can be found as described below.

Approximate Cell Center Locations

Figure 15:
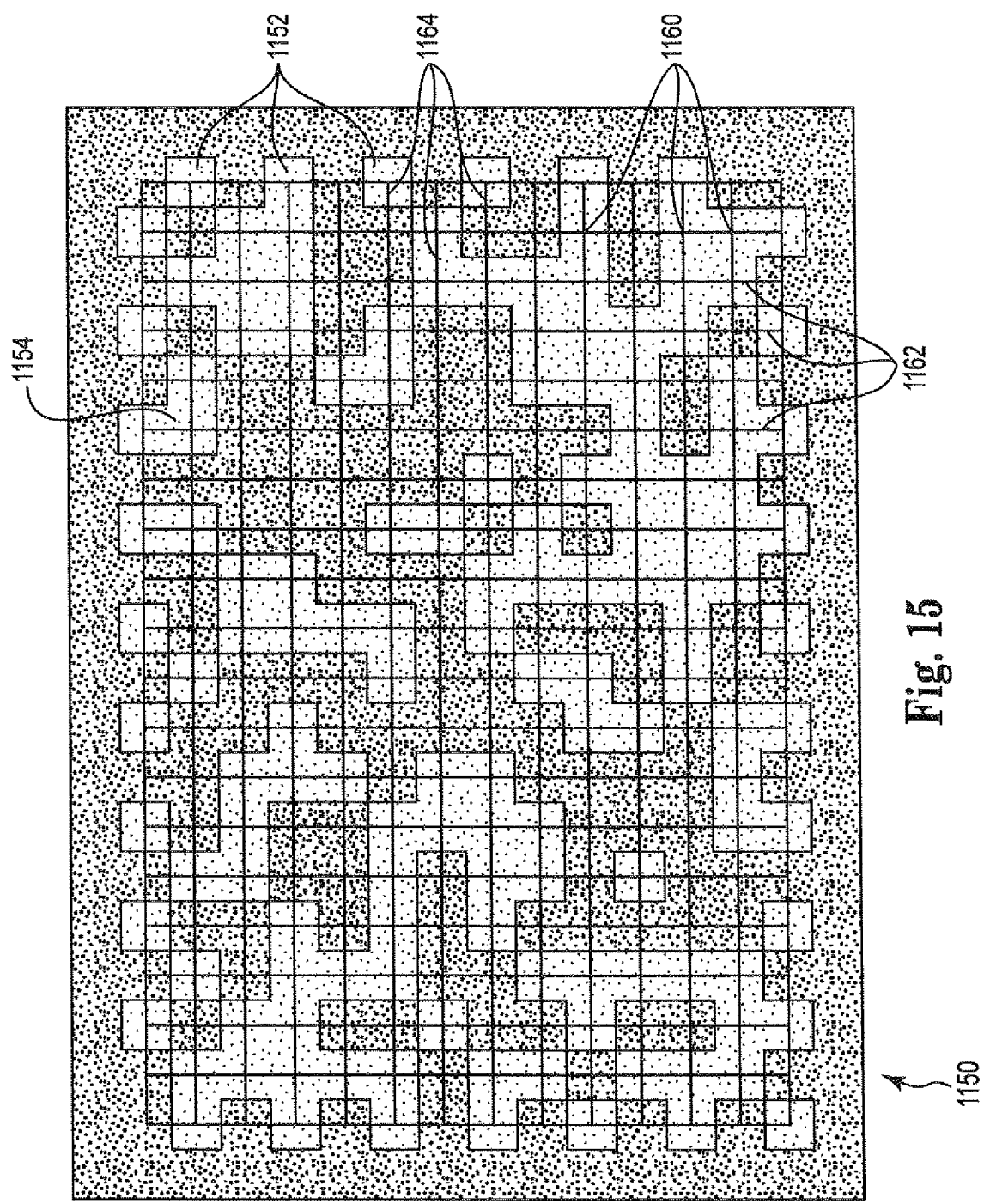
FIG. 15 is an illustration of an information symbol in accordance with the present invention showing how an approximate location of centers of cells of an information symbol may be found.

In step 624 of method 600, approximate center locations of each cell of the information symbol are located. Approximate tick mark widths and locations are determined as discussed above. From this information, the locations of the centers of all the tick marks in the symbol can be approximated. In particular, the location of two adjacent edges of each tick mark is determined. Then, the position in the tick mark that represents half the width of a tick mark at a perpendicular from each adjacent edge location in each direction is found. This is taken as the approximate center of the tick mark. FIG. 15 shows information symbol 1150 in accordance with the present invention having tick marks 1152 with centers 1160 and cells 1154. As shown, vertical rays 1162 and horizontal rays 1164 are drawn from the center of a tick mark along a first borderline of symbol 1150 to a corresponding tick mark along the borderline opposite the first borderline. The approximate center of each cell 1154 is taken as the intersection of each vertical ray 1162 with each horizontal ray 1164.

Figure 16:
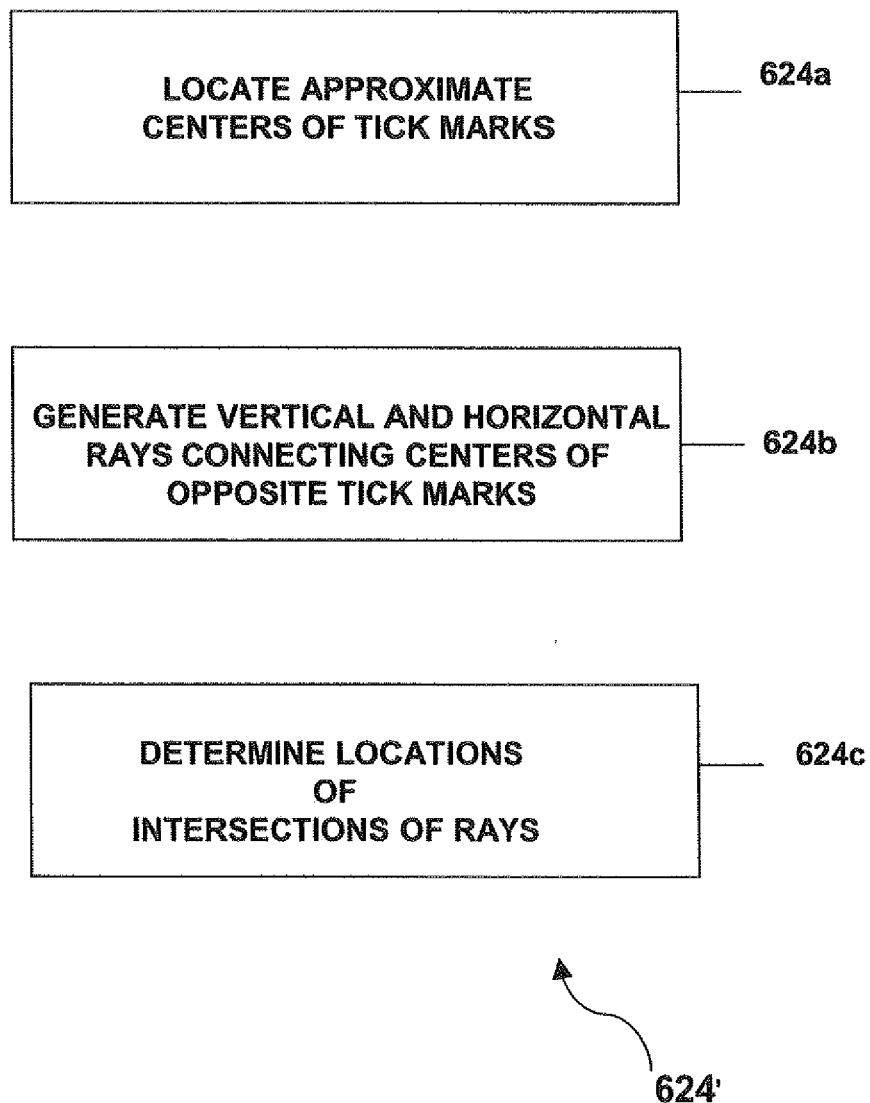
FIG. 16 is a flow chart showing one embodiment of a method in accordance with the present invention of locating the approximate center of cells of an information symbol.

A flowchart showing one embodiment of a preferred method 624' in accordance with the present invention of finding approximate cell centers of an information symbol is shown in FIG. 16. In step 624a, the approximate center of each tick mark is located as described above. Then, in step 624b, vertical and horizontal rays are generated connecting the centers of opposite tick marks as shown in FIG. 15. In step 624c, the locations of the intersections of the vertical and horizontal rays are determined and taken as the approximate center locations of the cells of the information symbol.

Correcting Image Projection Distortion

If the camera capturing the symbol image is located right above the symbol, the resulting captured image will likely be approximately rectangular, which is desirable. However, if the image is captured from the side or from the corner of the symbol, the resulting symbol image may have a distorted shape. This can make ultimate decoding of the symbol relatively difficult, or reduce accuracy, because it can skew the location of the centers of the cells, which, as noted above, is the part of each cell which is used to determine the color of that cell. Accordingly, in step 626, such projection distortion in an image may be corrected.

In the case where the image of the information symbol shows projection distortion, the far corners are apart from each other by a distance less than the near corners, which will result in sides that are not parallel.

Figure 17A:
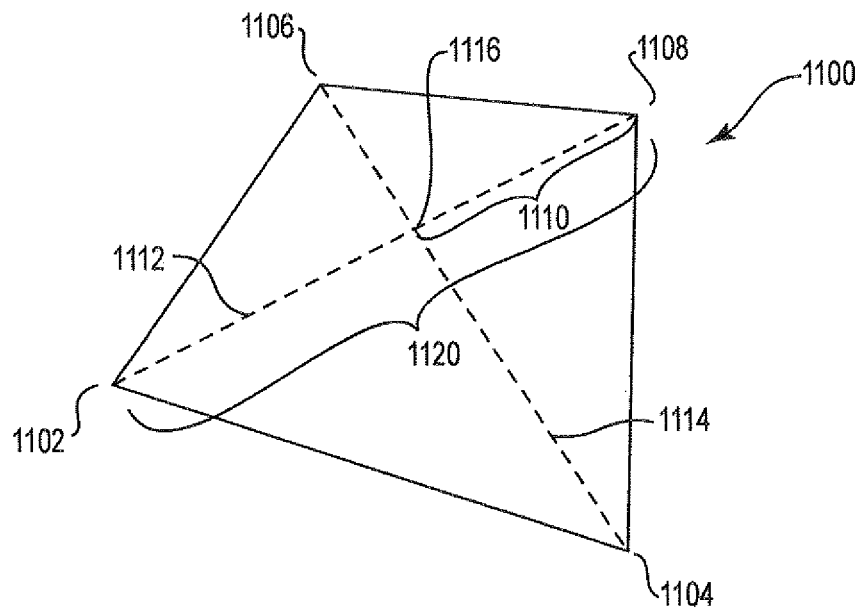
FIGS. 17A, 17B and 17C are illustrations of an information symbol showing how projection distortion may be reduced or removed in accordance with the present invention.

FIG. 17A shows a representation of an embodiment of an information symbol image 1100 having projection distortion. In particular, corners 1106 and 1108 appear closer together than corners 1102 and 1104. In a method to correct for this, diagonals 1112 and 1114 are generated between opposite corners. In a rectangle or square, diagonals 1112 and 1114 would bisect each other. However, in the representation of symbol image 1100, diagonals 1112 and 1114 do not bisect one another. In particular a distance 1110 from a point of intersection 1116 of diagonals 1112 and 1114 to corner 1108 is less than half the length 1120 of diagonal 1112. To correct for this, the location of corners 1102 and 1108 are preferably shifted in the direction of diagonal 1112 to make distance 1110 equal to half the length 1120 of diagonal 1112. This same process is then carried out with respect to corner 1106 and diagonal 1114. This process is preferably carried out using "scaled" integers to avoid floating point math. As used herein, scaled integers refers to numerical values that have had any decimal points removed so that the values are integer. For example, the scaled integer of the decimal value 12.45 is 1245.

Figure 17B:
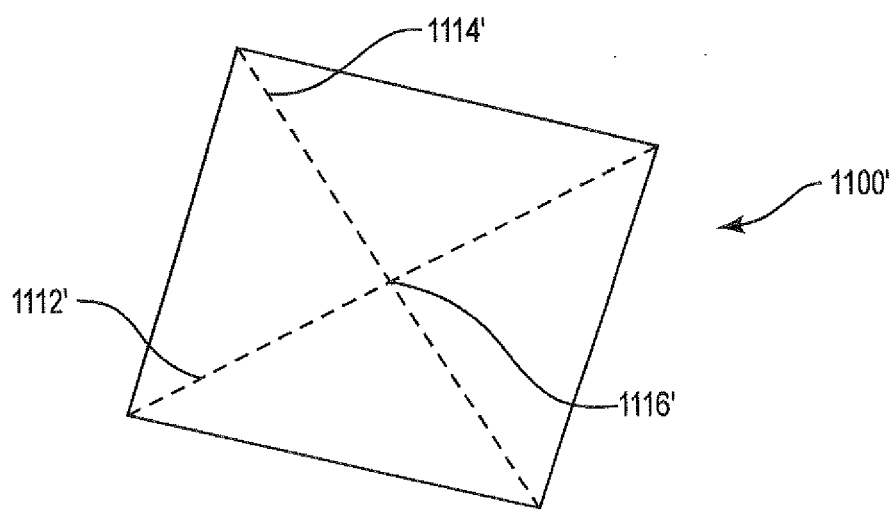

FIG. 17B illustrates information symbol image 1100, labeled as 1100', after shifting the corners thereof to cause the diagonals to bisect one another. In particular, diagonals 1112' and 1114' of symbol image 1100' now bisect each other, crossing at point 1116'.

After shifting the corners of an image of an information symbol to account for projection distortion, the centers of the cells, the approximate location of which was determined as discussed above, are preferably shifted to account for projection distortion. This is preferably done by first calculating what is referred to herein as a "z-factor", which is a correction factor that provides a relative measure of the amount of projection distortion effecting a given part of an image.

Figure 17C:
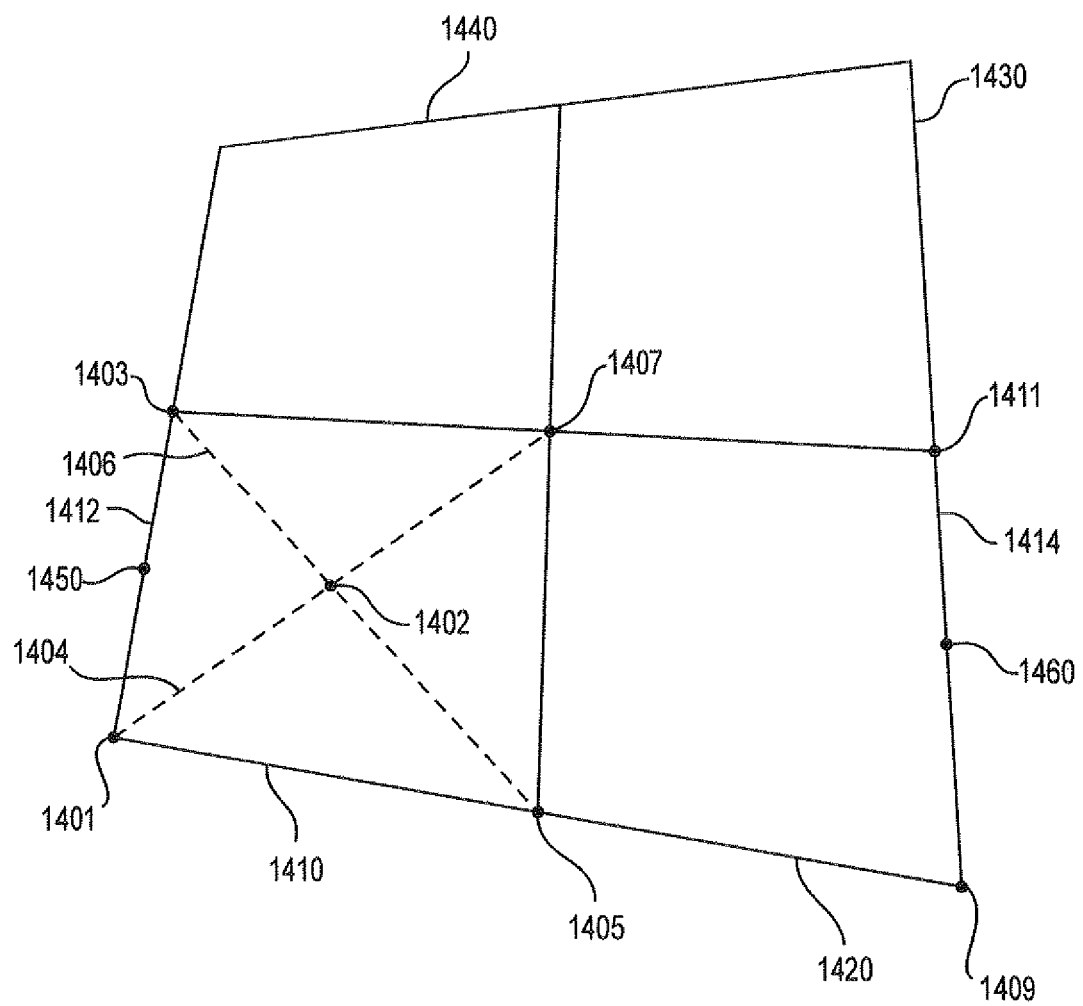
Figure 19:
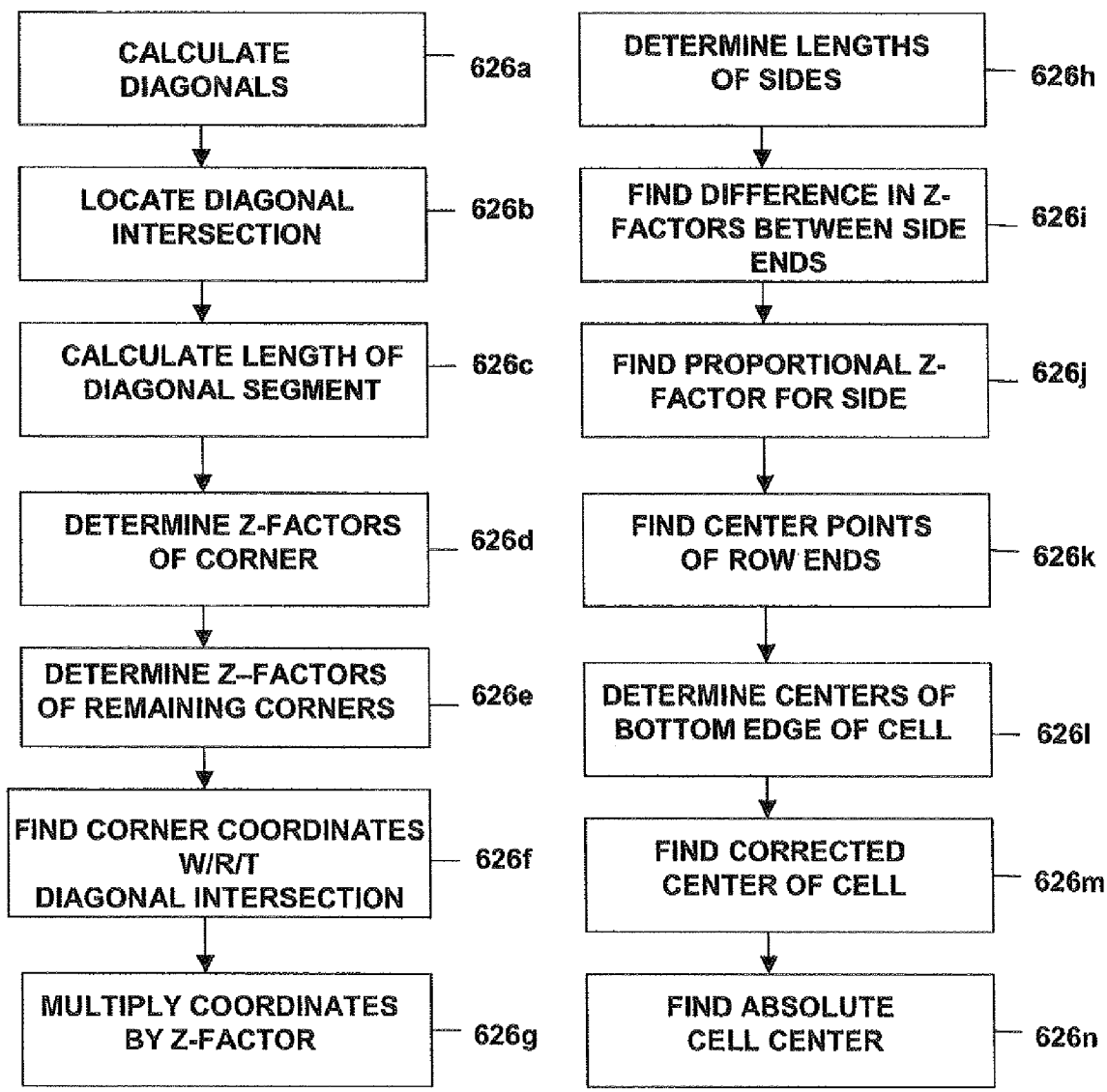
FIG. 19 is a flow chart showing one embodiment of a method in accordance with the present invention of reducing or removing projection distortion to more accurately locate the centers of cells of an information symbol.

FIG. 17C is a diagram illustrating a preferred method in accordance with the present invention for calculating a z-factor and then using it to correct the center position of a cells in an image of an information symbol. FIG. 17C shows a representation of four cells 1410, 1420, 1430 and 1440 of an image of an information symbol that has projection distortion. Cell 1410 includes diagonals 1404 and 1406. FIG. 19 is a flow chart illustrating the steps of such a method 626'. In particular, to find a z-factor for corner 1401 of cell 1410, in step 626a of method 626', the length of each diagonal 1404 and 1406 of cell 1410 is calculated. In step 626b, the location of the intersection 1402 is determined. In step 626c, the length of the diagonal segment from intersection 1402 to corner 1401 is determined. Then, in step 626d, the z-factor is determined by dividing the half the length of diagonal 1404 by the length of the diagonal segment calculated in step 626c. In step 626e, this process is repeated for each of the remaining three corners 1403, 1405 and 1407 in cell 1404.

To use these calculated z-factors to correct the position of the center of cells 1410, 1420, 1430 and 1440, in step 626f of method 626', the x,y coordinates of each corner 1401, 1403, 1405 and 1407 of cell 1410 is found with respect to the intersection point 1402 of the two diagonals 1404 and 1406 of cell 1410. In step 626g, each such relative set of corner coordinates is multiplied by the z-factor for that corner. These are referred to as the "scaled coordinates". Next, in step 626h, the length of side 1412 of cell 1410 and of side 1414 of cell 1420 is determined and in step 626i, the difference in the z-factor for the corners of each side is determined. That is, the length of side 1412 is determined and the difference in the z-factors for corner 1401 and corner 1403 is found. And, separately, the length of side 1414 is determined and the difference in the z-factors for corner 1409 and corner 1411 is found. From the length of a side and the difference in the z-factor for each corner of that side, a proportional z-factor can be determined for that side in step 626j. The proportional z-factor will give the change in z-factor for any change in distance along a side of a cell or cells for which it is calculated. In step 626k, the center point 1450 and 1460 of each row end is determined along with the z-factor for each point 1450 and 1460 (a first row being formed by cell 1410 and 1420 and a second row being formed by cell 1430 and cell 1440). The z-factors for points 1450 and 1460 can be determined using the proportional z-factors for sides 1412 and 1414, respectively, found in step 626j. In step 626l, the methods of steps 626h through 626k are used to determine the centers of bottom edges of cells 1410, 1420, 1430 and 1440. In step 626m, the coordinates generated in steps 626k and 626l are used to find the corrected center of cell 1410. To find the absolute coordinates of the center of cell 1410, in step 626n, the scaled coordinates for the center of cell 1410 is divided by the z-factor for these coordinates (found by using the proportional z-factor) and the result is added to the coordinates of center point 1402.

Figure 18A:
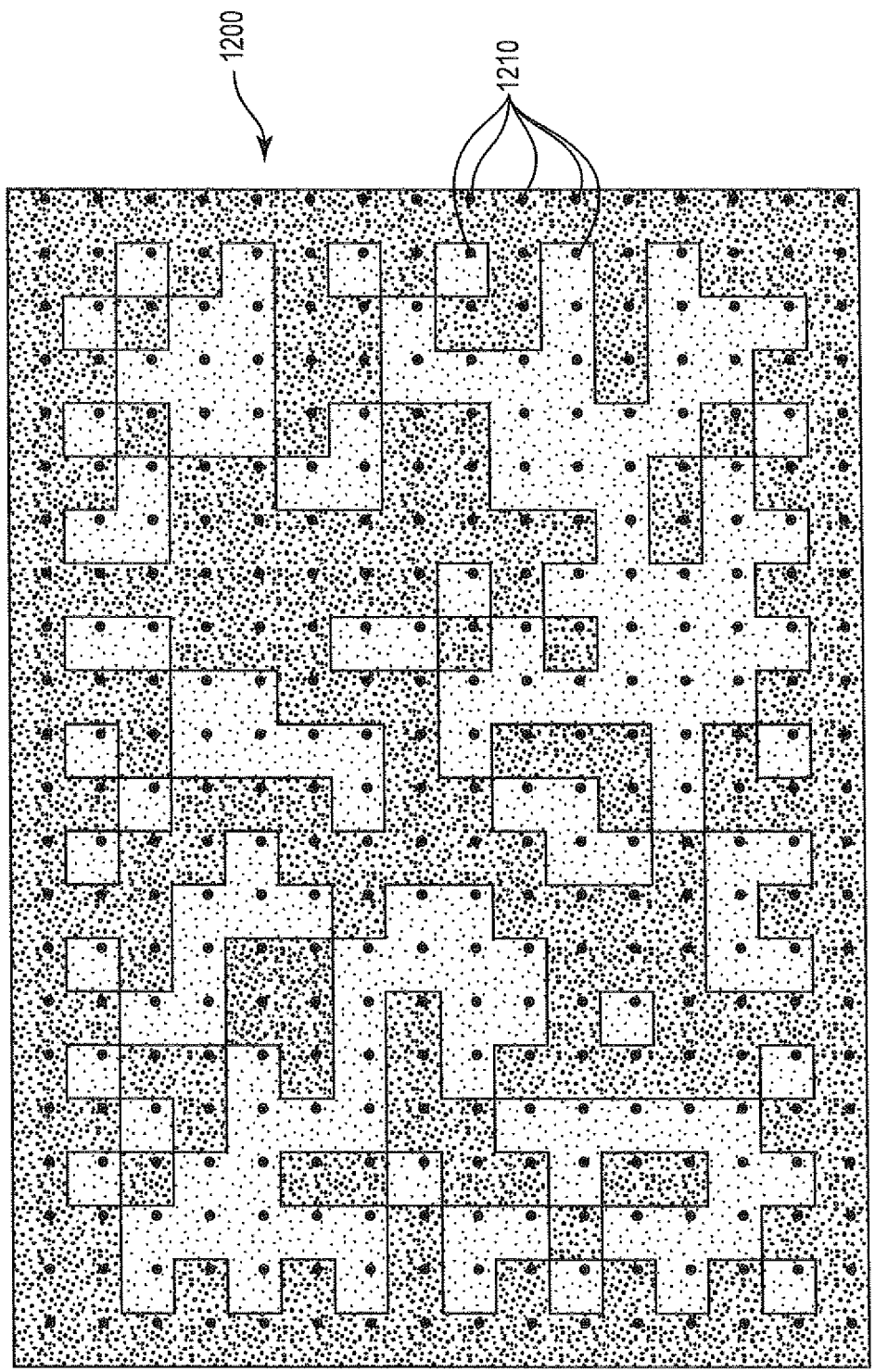
FIGS. 18A and 18B are illustrations of an information symbol in accordance with the present invention showing how reducing or removing projection distortion can allow more accurate location of centers of cells of the information symbol.
Figure 18B:
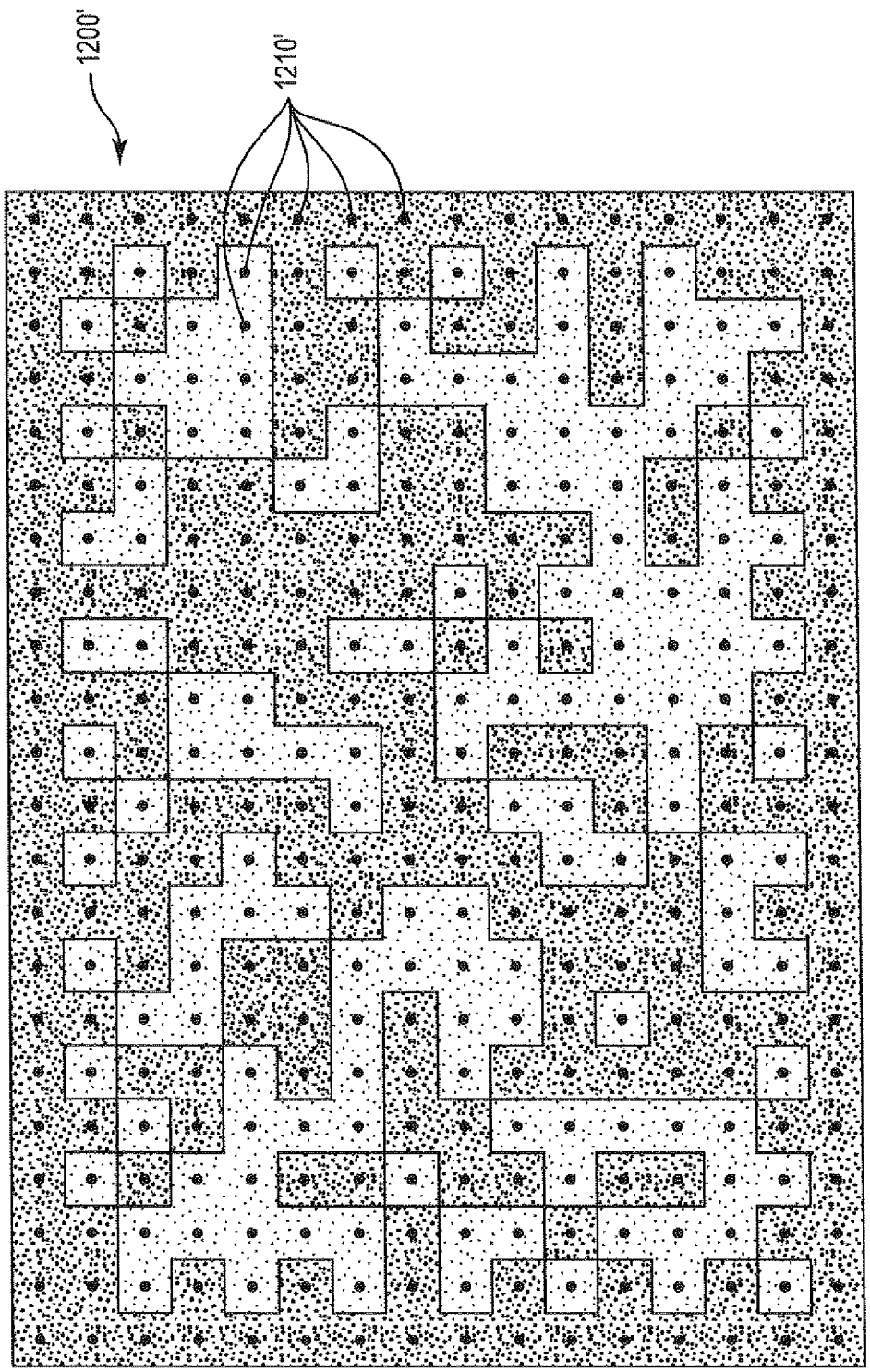

FIGS. 18A and 18B illustrate the results of carrying out a method such as method 626' of FIG. 19 on an information symbol. FIG. 18A shows information symbol 1200 having a plurality of cells. Points 1210 illustrate the position of the centers of the cells of information symbol 1200 that are calculated without correcting for projection distortion. As shown, a number of points 1210 are not near the centers of the cells of symbol 1200 and many points are on the borders between cells. FIG. 18B shows information symbol 1200' any projection distortion of which has been corrected using a method for correcting projection distortion in accordance with the present invention. Points 1210' show the center points of the cells of symbol 1200' calculated after correcting for projection distortion. As shown, the calculated center points 1210' of the cells appear much closer to the actual centers of the cells and no calculated center points appear at a border between cells. Accordingly, the calculated cell center points of symbol 1200' can provide more accurate information about the color of each cell of symbol 1200' than if projection distortion were not corrected.

It is to be understood that the method of reducing projection distortion in an image of an information symbol in accordance with the present invention discussed above can be applied to any information symbol using a matrix of data cells.

Orient the Symbol

Once the information symbol is acquired, reconstructed and distortion is reduced or corrected, in step 628 of method 600, the symbol is correctly oriented to be decoded. As noted above, only one corner (inside the borderlines) of an information symbol in accordance with the present invention is background color. In a correct orientation this orientation corner is the lower left corner. So, to correctly orient the information symbol, the orientation corner is located in the lower left of the information symbol. The image however can be flipped horizontally or vertically as in the case of being scanned from the back side of a transparency. To determine if this is the case, a first attempt is made to decode the symbol and if this first attempt fails, the mirror image of the symbol is generated and then the attempt to decode is repeated.

Decoding the Symbol

Figure 20:
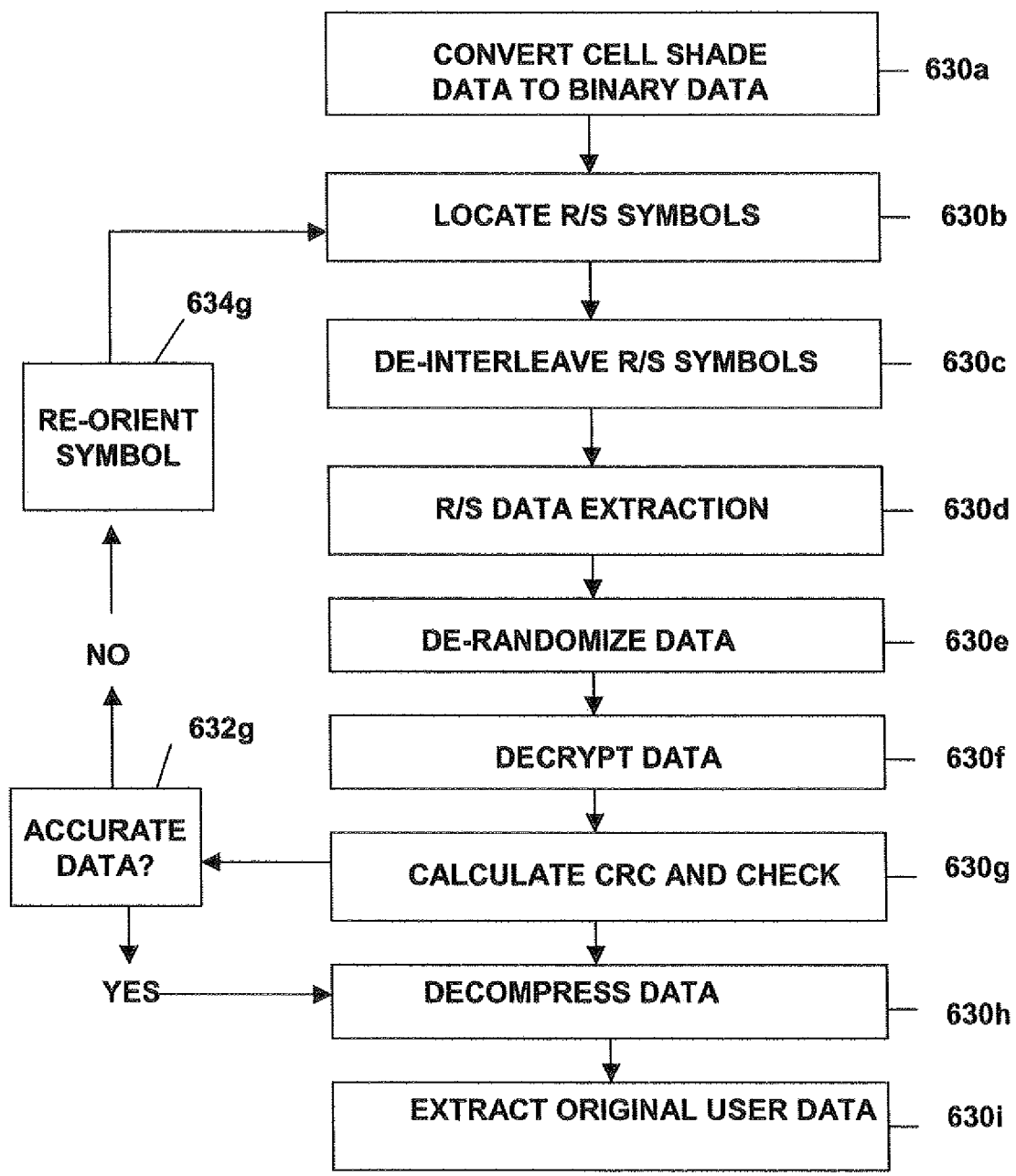
FIG. 20 is a flow chart showing one embodiment of a method in accordance with the present invention of decoding an information symbol.

In step 630 of method 600, the image processed information symbol is decoded into the original data. FIG. 20 is a flow chart illustrating a method in accordance with the present invention for decoding an information symbol after image processing steps discussed above. In step 630*a*, the cell color pattern is converted into binary data. In one embodiment, foreground cells may be converted into "1"s and background cells may be converted into "0"s. As discussed above, the binary value of the cell is determined at the center of the cell. This binary data is preferably maintained in the pattern of the cells. In step 630*b*, the Reed-Solomon symbols are located binary data pattern according to the pattern used when encoding the symbol. Then, in step 630*c*, the Reed-Solomon symbols are de-interleaved, again, according to the interleaving algorithm used during encoding. In step 630*d*, data is extracted from the de-interleaved Reed-Solomon symbols according the Reed-Solomon algorithm used to generate the symbols during encryption. If a randomization bit mask was used during encoding, then in step 630*e*, the corresponding de-randomizing bit mask is used to de-randomize the data. And, if data was encrypted during encoding, in step 630*f*, the data is decrypted. As discussed above with respect to step 512 of FIG. 5, the encryption key could optionally be attached to the bit stream of user data (after encryption) and included in the information symbol. If this was done, then the key to decrypt the data can be identified in the de-randomized data and used to decrypt the data. In step 630*g*, the CRC for the decrypted data is calculated and the accuracy of the original data is checked.

At this point, in step 632*g* if it is determined that the data is not accurate, it may be because, due to damage or other reasons, the image of the information symbol was not oriented correctly. Thus, if the CRC does not match, in step 634*g* the image may be rotated 90 degrees and/or the mirror image of the image may be determined and the decoding process started from step 630*a* again.

If the CRC check determines that the data is accurate, then in step 630*h*, if the data was compressed during encoding, it is preferably decompressed. As discussed above, the compression key can be appended to the user data bit stream during encoding. If this was done, this appended compression key can be used to decompress the data. Then, in step 630*i*, the original user data is preferably extracted from the resulting decompressed data.

Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A method of reading an information symbol having:
   four borders defining an interior region; and data cells within the interior region comprising a plurality of first shade tick marks and plurality of second shade tick marks, the method including:
   acquiring an image of the information symbol;
   identifying plural borderlines in the image of the information symbol;
   determining location information for a plurality of data cells;
   reducing projection distortion in the image of the information symbol;
   modifying the location information of the image as a result of the reduction of projection distortion; and
   decoding data in the data cells of the image of the information symbol.

2. The method of claim 1 including binarizing the image of the information symbol.

3. The method of claim 1 wherein the step of determining location information comprises locating the centers of the data cells in the image of the information symbol.

4. The method of claim 1 including orienting the image of the information symbol.

5. The method of claim 1 including orienting the image of the information symbol.

6. A method of reading an information symbol having:
   four borders defining rectangular symbol including an interior region; and data cells within the interior region comprising a plurality of first shade tick marks and plurality of second shade tick marks, the method including:
   acquiring an image of the information symbol;
   identifying plural borderlines in the image of the information symbol;
   reducing projection distortion in the image of the information symbol by changing a distorted image of the rectangular symbol to a rectangular image of the symbol;
   and
   decoding data in the data cells of the image of the information symbol.

7. The method of claim 6 including binarizing the image of the information symbol.

8. The method of claim 6 further comprising a step of determining location information comprises locating the centers of the data cells in the image of the information symbol.

* * * * *